(12) United States Patent
Alverson et al.

(10) Patent No.: US 7,360,221 B2
(45) Date of Patent: Apr. 15, 2008

(54) TASK SWAP OUT IN A MULTITHREADED ENVIRONMENT

(75) Inventors: Gail A. Alverson, Seattle, WA (US); Charles David Callahan, II, Seattle, WA (US); Susan L. Coatney, Federal Way, WA (US); Brian D. Koblenz, Seattle, WA (US); Richard D. Korry, Seattle, WA (US); Burton J. Smith, Seattle, WA (US)

(73) Assignee: Cray Inc., Seattle, WA (US)

( * ) Notice: Subject to any disclaimer, the term of this patent is extended or adjusted under 35 U.S.C. 154(b) by 834 days.

(21) Appl. No.: 10/659,407

(22) Filed: Sep. 10, 2003

(65) Prior Publication Data

US 2004/0088711 A1 May 6, 2004

Related U.S. Application Data

(62) Division of application No. 09/192,205, filed on Nov. 13, 1998, now Pat. No. 6,952,827.

(51) Int. Cl.
*G06F 9/46* (2006.01)

(52) U.S. Cl. ............... 718/108; 718/102; 718/103; 718/107; 712/228

(58) Field of Classification Search ............... 718/108, 718/102–103, 107; 712/228
See application file for complete search history.

(56) References Cited

U.S. PATENT DOCUMENTS 4,819,234 A 4/1989 Huber 4,872,167 A 10/1989 Maezawa et al.

(Continued)

FOREIGN PATENT DOCUMENTS

DE 19710252 2/1998

(Continued)

OTHER PUBLICATIONS

Adelberg, Brad et al., "The Strip Rule System for Efficient Maintaining Derived Data," Sigmod Record, Association for Computing Machinery, New York, vol. 26, No. 2, Jun. 1, 1997.

(Continued)

*Primary Examiner*—Meng-Al T. An
*Assistant Examiner*—Michael Wilser
(74) *Attorney, Agent, or Firm*—Perkins Coie LLP

(57) ABSTRACT

A method and system that prepares a task for being swapped out from processor utilization that is executing on a computer with multiple processors that each support multiple streams. The task has one or more teams of threads, where each team represents threads executing on a single processor. The task designates, for each stream that is executing a thread, one stream as a team master stream and one stream as a task master stream. For each team master stream, the task notifies the operating system that the team is ready to be swapped out when each other thread of the team has saved its state and has quit its stream. Finally, for the task master stream, the task notifies the operating system that the task is ready to be swapped when it has saved its state and each other team has notified that it is ready to be swapped out.

47 Claims, 23 Drawing Sheets

U.S. PATENT DOCUMENTS

| | | | |
|---|---|---|---|
| 5,168,554 A | 12/1992 | Luke | |
| 5,179,702 A * | 1/1993 | Spix et al. | 718/102 |
| 5,197,138 A | 3/1993 | Hobbs et al. | |
| 5,257,358 A | 10/1993 | Cohen | |
| 5,301,325 A | 4/1994 | Benson | |
| 5,333,280 A | 7/1994 | Ishikawa et al. | |
| 5,450,575 A | 9/1995 | Sites | |
| 5,485,626 A | 1/1996 | Lawlor et al. | |
| 5,504,932 A | 4/1996 | Vassiliadis et al. | |
| 5,524,250 A | 6/1996 | Chesson et al. | |
| 5,526,521 A | 6/1996 | Fitch et al. | |
| 5,533,192 A | 7/1996 | Hawley et al. | |
| 5,557,761 A | 9/1996 | Chan | |
| 5,564,051 A | 10/1996 | Halliwell | |
| 5,581,764 A | 12/1996 | Fitzgerald | |
| 5,594,864 A | 1/1997 | Trauben | |
| 5,598,560 A | 1/1997 | Benson | |
| 5,621,886 A | 4/1997 | Alpert et al. | |
| 5,632,032 A | 5/1997 | Ault | |
| 5,652,889 A | 7/1997 | Sites | |
| 5,668,993 A | 9/1997 | Peters et al. | |
| 5,712,996 A | 1/1998 | Schepers | |
| 5,740,413 A | 4/1998 | Alpert et al. | |
| 5,754,855 A | 5/1998 | Miller | |
| 5,768,591 A | 6/1998 | Robinson | |
| 5,768,592 A | 6/1998 | Chang | |
| 5,774,358 A | 6/1998 | Shrote | |
| 5,774,721 A | 6/1998 | Robinson | |
| 5,778,230 A | 7/1998 | Wimble et al. | |
| 5,787,245 A | 7/1998 | You et al. | |
| 5,805,892 A | 9/1998 | Nakajima | |
| 5,812,811 A * | 9/1998 | Dubey et al. | 712/216 |
| 5,826,265 A | 10/1998 | Van Huben et al. | |
| 5,867,643 A | 2/1999 | Sutton | |
| 5,877,766 A | 3/1999 | Bates et al. | |
| 5,887,166 A * | 3/1999 | Mallick et al. | 718/102 |
| 5,901,315 A | 5/1999 | Edwards et al. | |
| 5,903,730 A | 5/1999 | Asai et al. | |
| 5,913,925 A | 6/1999 | Kahle et al. | |
| 5,953,530 A | 9/1999 | Rishi et al. | |
| 5,961,639 A | 10/1999 | Mallick et al. | |
| 5,966,539 A | 10/1999 | Srivastava | |
| 5,978,902 A | 11/1999 | Mann | |
| 6,002,872 A | 12/1999 | Alexander, III et al. | |
| 6,002,879 A | 12/1999 | Radigan et al. | |
| 6,003,066 A | 12/1999 | Ryan et al. | |
| 6,009,269 A | 12/1999 | Burrows et al. | |
| 6,016,542 A | 1/2000 | Gottlieb et al. | |
| 6,029,005 A | 2/2000 | Radigan | |
| 6,049,671 A | 4/2000 | Slivka et al. | |
| 6,058,493 A | 5/2000 | Talley | |
| 6,059,840 A * | 5/2000 | Click, Jr. | 717/154 |
| 6,072,952 A | 6/2000 | Janakiraman | |
| 6,088,788 A | 7/2000 | Borkenhagen et al. | |
| 6,094,716 A * | 7/2000 | Witt | 712/23 |
| 6,101,524 A | 8/2000 | Choi et al. | |
| 6,105,051 A * | 8/2000 | Borkenhagen et al. | 718/103 |
| 6,112,293 A | 8/2000 | Witt | |
| 6,151,701 A | 11/2000 | Humphreys et al. | |
| 6,151,704 A | 11/2000 | Radigan | |
| 6,195,676 B1 | 2/2001 | Spix et al. | |
| 6,212,544 B1 | 4/2001 | Borkenhagen et al. | |
| 6,219,690 B1 | 4/2001 | Slingwine et al. | |
| 6,223,202 B1 | 4/2001 | Bayeh | |
| 6,233,599 B1 | 5/2001 | Nation et al. | |
| 6,272,520 B1 | 8/2001 | Sharangpani et al. | |
| 6,282,638 B1 * | 8/2001 | Dowling | 712/228 |
| 6,289,446 B1 | 9/2001 | Nilsson et al. | |
| 6,298,370 B1 | 10/2001 | Tang et al. | |
| 6,466,898 B1 * | 10/2002 | Chan | 703/17 |
| 6,470,376 B1 * | 10/2002 | Tanaka et al. | 718/108 |
| 6,487,590 B1 | 11/2002 | Foley et al. | |
| 6,505,229 B1 * | 1/2003 | Turner et al. | 718/107 |
| 6,529,958 B1 | 3/2003 | Oba et al. | |
| 6,560,626 B1 | 5/2003 | Hogle et al. | |
| 6,560,628 B1 | 5/2003 | Murata | |
| 6,567,839 B1 | 5/2003 | Borkenhagen et al. | |
| 6,584,489 B1 | 6/2003 | Jones et al. | |
| 6,594,698 B1 | 7/2003 | Chow et al. | |
| 6,622,155 B1 | 9/2003 | Haddon et al. | |
| 6,631,425 B1 | 10/2003 | Helland et al. | |
| 6,766,515 B1 | 7/2004 | Bitar et al. | |
| 6,785,887 B2 | 8/2004 | Armstrong et al. | |
| 2002/0103847 A1 | 8/2002 | Potash | |

FOREIGN PATENT DOCUMENTS

| | | |
|---|---|---|
| EP | 0422945 | 4/1991 |
| EP | 0455966 | 11/1991 |
| EP | 0537098 | 4/1993 |
| EP | 0855648 | 7/1998 |
| EP | 0864979 | 9/1998 |
| GB | 2307760 | 6/1997 |

OTHER PUBLICATIONS

Agrawal, Gagan et al., "Interprocedural Data Flow Based Optimizations for Compilation of Irregular Problems," Annual Workshop on Language and Compilers for Parallel Computing, 1995.

Alverson, Gail et al., "Processor Management in the Tera MTA System," 1995.

Alverson, Gail et al., "Scheduling on the Tera MTA," Job Scheduling Strategies for Parallel Processing, 1995.

Alverson, Robert et al., "The Tera Computer System,"Proceedings of 1990 ACM International Conference on Supercomputing, Jun. 1990.

Anderson, Jennifer, et al., "Continuous Profiling: Where Have All The Cycles Gone?," Operating SystemsReview, ACM Headquarters, New York, vol. 31, No. 5, Dec. 1, 1997.

Bailey, D.H. et al., "The NAS Parallel Benchmarks—Summary and Preliminary Results," Numerical Aerodynamic Simulation (NAS) Systems Division, NASA Ames Research Center, California, 1991.

Briggs, Preston et al., "Effective Partial Redundancy Elimination," ACM SIGPLAN Notices, Association for Computing Machinery, New York, vol. 29, No. 6, Jun. 1, 1994.

Callahan, David et al., A Future-Based Parallel Language for a General-Purpose Highly-Parallel Computer, Languages and Compilers for Parallel Computing, MIT Press, 1990.

Callahan, David et al., "Improving Register Allocation for Subscription Variables," Proceedings of the ACM SIGPLAN Conference on Programming Language Design and Implementation, White Plains, New York, Jun. 20-22, 1990.

Callahan, David, "Recognizing and Parallelizing Bounded Recurrences," Aug. 1991.

Click, Cliff, "Global Code Motion, Global Value Numbering," ACM SIGPLAN Notices, Association for Computing Machinery, New York, vol. 30, No. 6, Jun. 1, 1995.

Galarowicz, Jim et al., "Analyzing Message Passing Programs on the Cray T3E with PAT and VAMPIR," Research Report, "Online!", May 1998.

Goldman, Kenneth, J., "Introduction to Data Structures," 1996, Retrieved from Internet http://www.cs.wustl.edu/{kjg/CS101_SP97/Notes?DataStructures/structures.html.

Hayashi, H. et al., "ALPHA: A High Performance Lisp Machine Equipped with a New Stack Structure and Garbage Collection System," 10$^{th}$ Annual International Symposium on Computer Architecture, 1983.

Korry, Richard et al., "Memory Management in the Tera MTA System," 1995.

Linton, Mark A., "The Evolution of Dbx,"USENIX Summer Conference, Jun. 11-15, 1990.

Major System Characteristics of the TERA MTA, 1995.

Ram, A. et al., "Parallel Garbage Collection Without Synchronization Overhead," 12$^{th}$ Annual Symposium on Computer Architecture, Jun. 17, 1985.

Smith, Burton, "Opportunities for Growth in High Performance Computing," Nov. 1994.

Smith, Burton, "The End of Architecture," Keynote Address Presented at the 17th Annual Symposium on Computer Architecture, Seattle, Washington, May 29, 1990.

Smith, Burton, The Quest for General-Purpose Parallel Computing.

Sreedhar, Vugranam C. et al., "Incremental Computation of Dominator Trees," ACM SIGPLAN Notices, Association for Computing Machinery, New York, vol. 30, No. 3, Mar. 1, 1995.

Surajit, Chaudhuri et al., "An Overview of Data Warehousing and OLAP Technology," Sigmond Record, Association for Computing, New York, vol. 26, No. 1, Mar. 1997.

Tera MTA Principles of Operation, Nov. 18, 1997.

Touzeau, Roy F., "A Fortran Compiler for the FPS-164 Scientific Computer," Proceedings of the ACM SIGPLAN '84 Symposium on Compiler Construction, SIGPLAN Notices 19(6):48-57, Jun. 1984.

Silberschatz et al., "Operating System Concepts," Fifth Edition, John Wiley & Sons, Inc., 1998, p. 103.

"Method of Tracing Events in Multi-Threaded OS/2 Applications," IBM Tech. Disclosure Bulletin, Sep. 1993, pp. 19-22.

Agrawal, Hiralal, "Dominators, Super Blocks and Program Coverage," 21st ACM SIGPLAN-SIGACT Symposium on Principles of Programming Languages, Portland, Oregon, Jan. 17-21, 1994.

Alverson, Gail et al., "Tera Hardware-Software Cooperation," Proceedings of Supercomputing 1997, San Jose, California, Nov. 1997.

Brigss, Preston, et al., "Coloring Heuristics for Register Allocation," Department of Computer Science, Rice University, Houston, Texas, Jun. 1989.

Briggs, Preston et al., "Coloring Register Pairs," ACM Letters on Programming Languages and Systems, vol. 1, No. 1, Mar. 1992.

Callahan, David et al., "Register Allocation via Hierarchical Graph Coloring," Proceedings of the ACM SIGPLAN '91 Conference on Programming Language Design and Implementation, Toronto, Canada, Jun. 26-28, 1991.

Chow, Fred C. et al., "The Priority-Based Coloring Approach to Register Allocation," ACM Transactions on Programming Languages and Systems, vol. 12, No. 4, Oct. 1990, pp. 501-536.

Cook, Jonathan et al., "Event Based Detection of Concurrency," SIGSOFT '98 ACM, 1998, pp. 34-45.

Davidson, Jack W. et al., "Reducing the Cost of Branches by Using Registers," Proceedings of the 17th Annual Symposium on Computer Architecture, Seattle Washington, May 28-31, 1990.

Kolte, Priyadarshan et al., "Load/Store Range Analysis for Global Register Allocation," ACM-SIGPLAN, Jun. 1993.

Knoop, Jens et al., "The Power of Assignment Motion," ACM SIGPLAN '95 Conference on Programming Language Design and Implementation, La Jolla, California, Jun. 18-21, 1995.

Lal, George et al., "Iterated Register Coalescing," ACM Transactions on Programming Languages and Systems, vol. 18, No. 3, May 1996, pp. 300-324.

Lang, Tomas et al., "Reduced Register Saving/Restoring in Single-Window Register Files," Computer Architecture News, vol. 14, No. 3, Jun. 1986.

Minwen, Ji et al., "Performance Measurements for Multithreaded Programs," SIGMETRICS '98, ACM, 1998, pp. 168-170.

Shim, SangMin et al., Split-Path Enhanced Pipeline Scheduling for Loops with Contorl Flows, IEEE, Dec. 2, 1998.

Tsai, Jenn-Yuan et al., "Performance Study of a Concurrent Multithreaded Processor," IEEE, 1998, pp. 24-35.

* cited by examiner

TASK SWAP OUT IN A MULTITHREADED ENVIRONMENT

CROSS-REFERENCE TO RELATED APPLICATION

This is a divisional of and claims priority to U.S. patent application Ser. No. 09/192,205, now U.S. Pat. No. 6,952,827 filed on Nov. 13, 1998, and which is hereby incorporated by reference.

TECHNICAL FIELD

The present invention relates to an interface between a user program and an operating system and, more particularly, to such an interface in a multithreaded environment.

BACKGROUND

Parallel computer architectures generally provide multiple processors that can each be executing different tasks simultaneously. One such parallel computer architecture is referred to as a multithreaded architecture (MTA). The MTA supports not only multiple processors but also multiple streams executing simultaneously in each processor. The processors of an MTA computer are interconnected via an interconnection network. Each processor can communicate with every other processor through the interconnection network. FIG. 1 provides a high-level overview of an MTA computer. Each processor 101 is connected to the interconnection network and memory 102. Each processor contains a complete set of registers 101a for each stream. In addition, each processor also supports multiple protection domains 101b so that multiple user programs can be executing simultaneously within that processor.

Each MTA processor can execute multiple threads of execution simultaneously. Each thread of execution executes on one of the 128 streams supported by an MTA processor. Every clock time period, the processor selects a stream that is ready to execute and allows it to issue its next instruction. Instruction interpretation is pipelined by the processor, the network, and the memory. Thus, a new instruction from a different stream may be issued in each time period without interfering with other instructions that are in the pipeline. When an instruction finishes, the stream to which it belongs becomes ready to execute the next instruction. Each instruction may contain up to three operations (i.e., a memory reference operation, an arithmetic operation, and a control operation) that are executed simultaneously.

The state of a stream includes one 64-bit Stream Status Word ("SSW"), 32 64-bit General Registers ("R0-R31"), and eight 32-bit Target Registers ("T0-T7"). Each MTA processor has 128 sets of SSWs, of general registers, and of target registers. Thus, the state of each stream is immediately accessible by the processor without the need to reload registers when an instruction of a stream is to be executed.

The MTA uses program addresses that are 32 bits long. The lower half of an SSW contains the program counter ("PC") for the stream. The upper half of the SSW contains various mode flags (e.g., floating point rounding, lookahead disable), a trap disable mask (e.g., data alignment and floating point overflow), and the four most recently generated condition codes. The 32 general registers are available for general-purpose computations. Register R0 is special, however, in that it always contains a 0. The loading of register R0 has no effect on its contents. The instruction set of the MTA processor uses the eight target registers as branch targets. However, most control transfer operations only use the low 32 bits to determine a new program counter. One target register (T0) points to the trap handler, which may be an unprivileged program. When a trap occurs, the trapping stream starts executing instructions at the program location indicated by register T0. Trap handling is lightweight and independent of the operating system and other streams. A user program can install trap handlers for each thread to achieve specific trap capabilities and priorities without loss of efficiency.

Each MTA processor supports as many as 16 active protection domains that define the program memory, data memory, and number of streams allocated to the computations using that processor. Each executing stream is assigned to a protection domain, but which domain (or which processor, for that matter) need not be known by the user program.

The MTA divides memory into program memory, which contains the instructions that form the program, and data memory, which contains the data of the program. The MTA uses a program mapping system and a data mapping system to map addresses used by the program to physical addresses in memory. The mapping systems use a program page map and a data segment map. The entries of the data segment map and program page map specify the location of the segment in physical memory along with the level of privilege needed to access the segment.

The number of streams available to a program is regulated by three quantities: the stream limit (slim), the current number of streams (scur), and the number of reserved streams (sres) associated with each protection domain. The current numbers of streams executing in the protection domain is indicated by scur; it is incremented when a stream is created and decremented when a stream quits. A create can only succeed when the incremented scur does not exceed sres, the number of streams reserved in the protection domain. The operations for creating, quitting, and reserving streams are unprivileged. Several streams can be reserved simultaneously. The stream limit slim is an operating system limit on the number of streams the protection domain can reserve.

When a stream executes a CREATE operation to create a new stream, the operation increments scur, initializes the SSW for the new stream based on the SSW of the creating stream and an offset in the CREATE operation, loads register (T0), and loads three registers of the new stream from general purpose registers of the creating stream. The MTA processor can then start executing the newly created stream. A QUIT operation terminates the stream that executes it and decrements both sres and scur. A QUIT_PRESERVE operation only decrements scur, which gives up a stream without surrendering its reservation.

The MTA supports four levels of privilege: user, supervisor, kernel, and IPL. The IPL level is the highest privilege level. All levels use the program page and data segment maps for address translation, and represent increasing levels of privilege. The data segment map entries define the minimum levels needed to read and write each segment, and the program page map entries define the exact level needed to execute from each page. Each stream in a protection domain may be executing at a different privileged level.

Two operations are provided to allow an executing stream to change its privilege level. A "LEVEL_ENTER lev" operation sets the current privilege level to the program page map level if the current level is equal to lev. The LEVEL_ENTER operation is located at every entry point that can accept a call from a different privilege level. A trap occurs if the current level is not equal to lev. The "LEV-EL_RETURN lev" operation is used to return to the original privilege level. A trap occurs if lev is greater than the current privilege level.

An exception is an unexpected condition raised by an event that occurs in a user program, the operating system, or the hardware. These unexpected conditions include various floating point conditions (e.g., divide by zero), the execution of a privileged operation by a non-privileged stream, and the failure of a stream create operation. Each stream has an exception register. When an exception is detected, then a bit in the exception register corresponding to that exception is set. If a trap for that exception is enabled, then control is transferred to the trap handler whose address is stored in register T0. If the trap is currently disabled, then control is transferred to the trap handler when the trap is eventually enabled assuming that the bit is still set in the exception register. The operating system can execute an operation to raise a domain_signal exception in all streams of a protection domain. If the trap for the domain_signal is enabled, then each stream will transfer control to its trap handler.

Each memory location in an MTA computer has four access state bits in addition to a 64-bit value. These access state bits allow the hardware to implement several useful modifications to the usual semantics of memory reference. These access state bits are two data trap bits, one full/empty bit, and one forward bit. The two data trap bits allow for application-specific lightweight traps, the forward bit implements invisible indirect addressing, and the full/empty bit is used for lightweight synchronization. The behavior of these access state bits can be overridden by a corresponding set of bits in the pointer value used to access the memory. The two data trap bits in the access state are independent of each other and are available for use, for example, by a language implementer. If a trap bit is set in a memory location, then an exception will be raised whenever that location is accessed if the trap bit is not disabled in the pointer. If the corresponding trap bit in the pointer is not disabled, then a trap will occur.

The forward bit implements a kind of "invisible indirection." Unlike normal indirection, forwarding is controlled by both the pointer and the location pointed to. If the forward bit is set in the memory location and forwarding is not disabled in the pointer, the value found in the location is interpreted as a pointer to the target of the memory reference rather than the target itself. Dereferencing continues until either the pointer found in the memory location disables forwarding or the addressed location has its forward bit cleared.

The full/empty bit supports synchronization behavior of memory references. The synchronization behavior can be controlled by the full/empty control bits of a pointer or of a load or store operation. The four values for the full/empty control bits are shown below.

| VALUE | MODE | LOAD | STORE |
| --- | --- | --- | --- |
| 0 | normal | read regardless | write regardless and set full |
| 1 | | reserved | reserved |
| 2 | future | wait for full and leave full | wait for full and leave full |
| 3 | sync | wait for full and set empty | wait for empty and set full |

When the access control mode (i.e., synchronization mode) is future, loads and stores wait for the full/empty bit of memory location to be accessed to be set to full before the memory location can be accessed. When the access control mode is sync, loads are treated as "consume" operations and stores are treated as "produce" operations. A load waits for the full/empty bit to be set to full and then sets the full/empty bit to empty as it reads, and a store waits for the full/empty bit to be set to empty and then sets the full/empty bit to full as it writes. A forwarded location (i.e., its forward bit is set) that is not disabled (i.e., by the access control of a pointer) and that is empty (i.e., full/empty bit is set to empty) is treated as "unavailable" until its full/empty bit is set to full, irrespective of access control.

The full/empty bit may be used to implement arbitrary indivisible memory operations. The MTA also provides a single operation that supports extremely brief mutual exclusion during "integer add to memory." The FETCH_ADD operation loads the value from a memory location and stores the sum of that value and another value back into the memory location.

Each protection domain has a retry limit that specifies how many times a memory access can fail in testing full/empty bit before a data blocked exception is raised. If the trap for the data blocked exception is enabled, then a trap occurs. The trap handler can determine whether to continue to retry the memory access or to perform some other action. If the trap is not enabled, then the next instruction after the instruction that caused the data blocked exception is executed.

The appendix contains the "Principles of Operation" of the MTA, which provides a more detailed description of the MTA.

SUMMARY

Embodiments of the present invention provide a method system for placing a task with multiple threads in a known state, such as a quiescent state. To effect the placing of the task in the known state, each thread of the task is notified that it should enter the known state. In response to receiving the notification, each of the threads enter the known state. When in the known state, certain actions can be performed safely without concern without corrupting the state of the task. The known state of the task may be the execution of idle instructions by each of the threads or by stopping the execution of instructions by the threads (e.g., quitting the streams). The notification may be by raising a domain signal for the protection domain in which the task is executing. The notification may also be initiated by the task itself by, for example, sending a request to the operating system. Prior to entering the known state, the threads may save their state information so that when the known state is exited the threads can restore their saved state and continue execution. The task, in response to receiving the notification, may also notify the operating system that the task is blocked from further productive use of the processor until an event occurs. In this way, rather than having the task continue to execute idle instructions (e.g., instructions looping checking for an event to occur), the operating system may assign the processor to another task. The operating system may also defer re-assigning the processor to the task until an event occurs that is directed to that task. Once a task has entered the known state, various actions can be performed relative to the task. For example, the operating system may assign the processor resources used to by that task to another task. Also, a debugger, which may be executing as one of the threads of the task, can access the state information saved by the other threads of the task. A designated thread of the task may also process operating system signals when the other threads of the task are in the known state. After the signals are processed by the thread, the other threads can be allowed to exit the known state. More generally, after the actions to be performed while the task is in the known state, then the threads of the task can exit the known state. A task that has entered a known state may exit the known state by receiving a notification to exit the known state. Upon receiving the notification, each thread exits the known state by executing instructions that were to be executed prior to entering the known state or more generally continuing with productive work (e.g., non-idle instructions). Upon receiving the notification, one thread may be designated as a master thread for causing the other threads to exit their known state (e.g., creating streams). The master thread may also perform signal processing prior to allowing the other threads to exit their known state.

One embodiment of the present invention provides a method in a multithreaded computer for preparing a task to be "swapped out" from processor utilization by placing the task in a known state. The computer has a processor with multiple streams for executing threads of the task. To prepare for being swapped out, the task designates one stream that is executing a thread to be a master stream. The task then saves the state of each stream that is executing a thread. Under control of each stream that is not the master stream, the task quits the stream. Under control of the master stream, the task notifies the operating system that the task is ready to be swapped out. The operating system can then swap the task out from processor utilization. In another embodiment, the method prepares a task that is executing on a computer with multiple processors. The task has one or more "teams" of threads where each team represents threads executing on a single processor. The task designates, for each stream, one stream that is executing a thread to be a team master stream. The task then designates one stream that is executing a thread to be a task master stream. For each team master stream, the task notifies the operating system that the team is ready to be swapped out when each other thread of the team has quit its stream. Finally, for the task master stream, the task notifies the operating system that the task is ready to be swapped out when each of the other teams have notified the operating system that that team is ready to be swapped out.

Other aspects of the present invention provide for a server to coordinate assignment of resources with various clients. The server initially assigns a resource to a client. The server then receives notification from the client assigned to the resource that the client is waiting for an occurrence of an event before the resource can be productively used. The server, upon receiving the notification, assigns the resource from the client and does not reassign that resource to the client until after the event occurs. In one embodiment, the server is an operating system, the clients are tasks, and the resource is a processor or protection domain. The server may receive the notification in response to a request that the task save its state information prior to having that resource un-assigned. After that external event occurs, the server can then reassign the resource to the task.

Another aspect of the present invention provides a method in a computer system for returning to a task a stream that is executing an operating system call that is blocked. The computer system has a processor with multiple streams. To return the stream, the operating system executing on a stream invokes a function provided by the task. The invoked function then executes instructions on that stream to effect the return of the stream to the task. The operating system then notifies the task when the operating system call is complete. Upon receiving the notification, the task can then continue the execution of the thread that invoked the blocking operating system call.

More generally, the present invention assigns a processor resource to a task after a thread of the task invokes an operating system call that will block waiting for the occurrence of an event. To assign the processor resource back to the task, the operating system invokes a routine of the task so that that routine can assign the processor resource to another thread of the task. In this way, the task can continue to execute other threads even though one of its threads may be blocked on operating system call.

Another aspect of the present invention provides, a method in a computer system for performing an inter-thread long jump from a long jump thread to a set jump thread. To effect the inter-thread long jump, the long jump thread receives an indication of a set jump location that was set by the set jump thread. The long jump thread then determines whether the set jump thread is the same thread that is currently executing. When the set jump thread is not the same thread that is currently executing, the long jump thread sets the state of the set jump thread to next execute a long jump indicating the set jump location. When the set jump thread executes its next instructions, an intra-thread long jump is performed.

DETAILED DESCRIPTION

Figure 1:
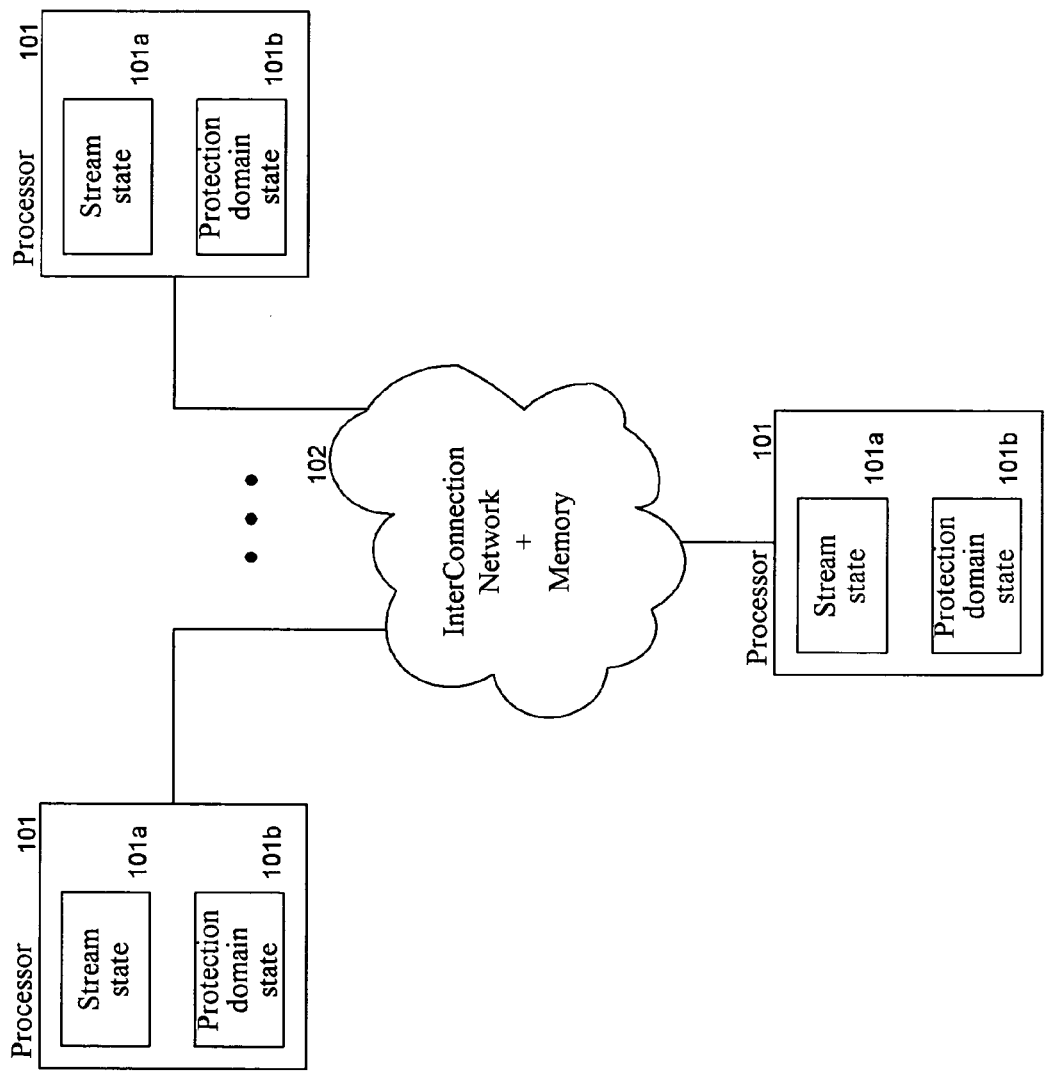
FIG. 1 provides a high-level overview of the MTA.

Embodiments of the present invention provide an interface between a user program and an operating system in an MTA computer. In one aspect of the present invention, the user program cooperates with the operating system in saving the state of the user program when the operating system wants to allocate the protection domain in which the user program is executing to another user program so that the other user program may start executing its instructions. The operating system allows each user program to execute for a certain time slice or quantum before "swapping out" the user program from its protection domain. The operating system notifies the user program when the quantum expires. Each stream that is allocated to that user program receives the notification. Upon receiving the notification, each stream saves its state and quits except for one stream that is designated as a master stream. The master stream saves its state and waits for all the other streams to quit. The master stream then notifies the operating system that the user program is ready to be swapped out of its protection domain. The master stream also notifies the operating system of the number of streams that were created (or alternatively reserved) when the quantum expired. When the operating system decides to allow the user program to start executing again (i.e., be "swapped in"), the operating system restarts the thread that was executing in the master stream. That thread then creates the other streams and restarts each of the threads executing where they left off using the saved state. The operating system may defer swapping in the user program until sufficient streams (as indicated by the user program when it was swapped out) are available so that when the user program is swapped in, it can create the same number of streams it quit when swapping out.

In another aspect of the present invention, the operating system returns streams to the user program when the thread that was executing on the stream is blocked on an operating system call. Each user program may be limited to a certain number of streams by the operating system. A user program can create streams up to this limit and start different threads executing in each of the created streams. When a thread makes an operating system call, the operating system starts executing on the same stream on which the thread was executing. When the operating system call blocks (e.g., waiting for user input), the operating system returns that stream to the user program so that the user program can schedule another thread to execute on that stream. The operating system eventually notifies the user program when the operating system call completes, and the user program can restart the thread that was blocked on that operating system call. In this way, the user program can continue to use all of its created streams even though a thread is blocked on an operating system call.

In another aspect of the present invention, Unix-type set jump and long jump inter-thread behavior is supported. When invoked, a set jump function stores the current state of the stream in a set jump buffer. The current state includes the return address for that invocation of the set jump function. When a long jump function is eventually invoked passing the set jump buffer as a parameter, the long jump function deallocates memory (e.g., stack frames) allocated since the set jump function was invoked, restores the stream state stored in the set jump buffer, and jumps to the return address. If the long jump function is invoked by a thread ("the long jump thread") different from the thread ("the set jump thread") that invoked the set jump function, the long jump function first locates the state information for the set jump thread. The long jump function then sets the program counter in that state information to point to an instruction that invokes the long jump function passing the set jump buffer. When the set jump thread then executes its next instruction, an intra-thread long jump is performed.

Figure 2:
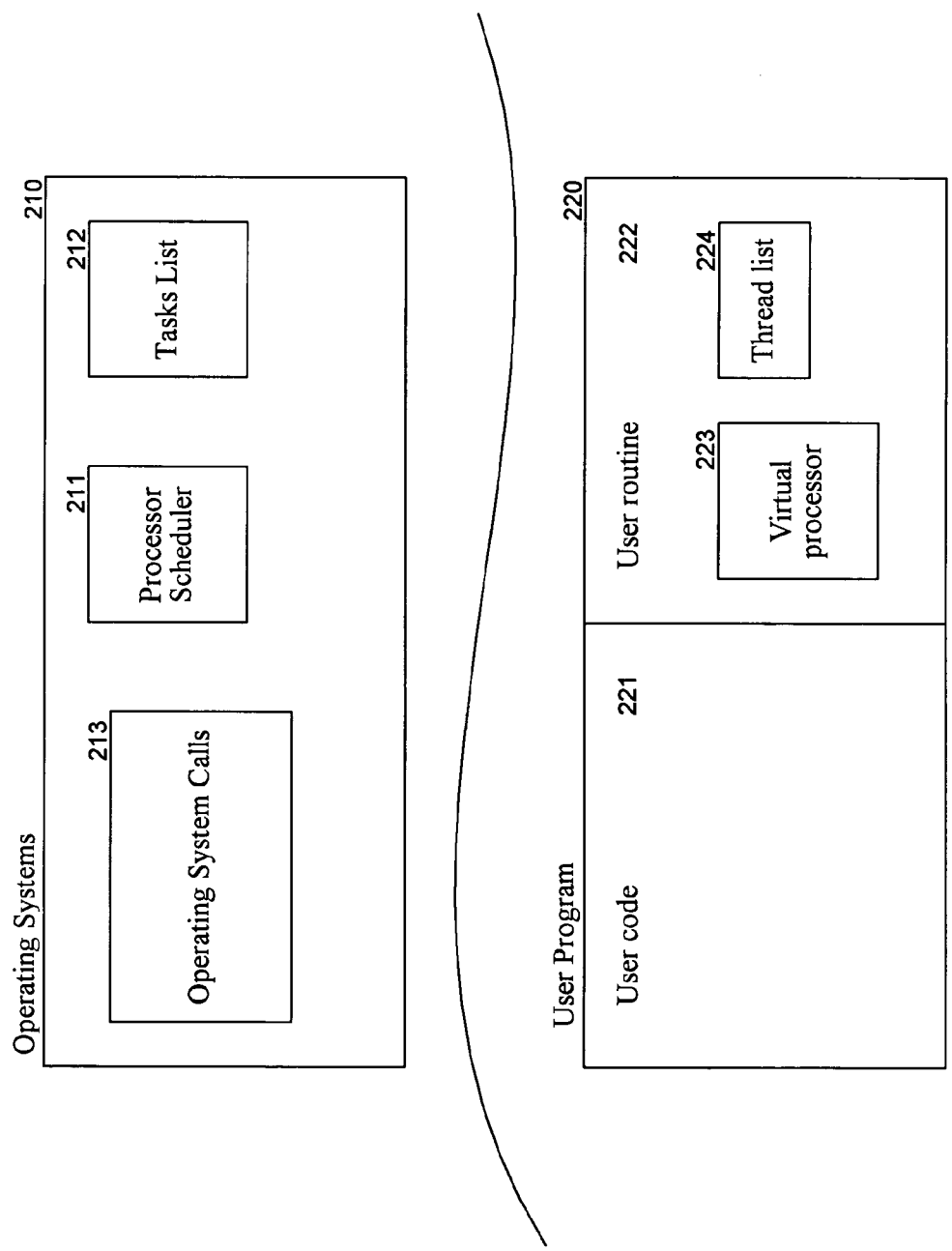
FIG. 2 is a block diagram illustrating components of the operating system and user programs in one embodiment.

FIG. 2 is a block diagram illustrating components of the operating system 210 and user programs 220 in one embodiment. The operating system includes a processor scheduler 211, a task list 212, and instructions implementing various operation system calls 213. The processor scheduler assigns tasks to execute in the protection domains of a processor, such tasks are referred to as active tasks. The term "task" refers to a running user program that may currently be either active or inactive. Periodically (e.g., when a time quantum expires), the processor scheduler determines whether an inactive task should be made active. If all the protection domains are already assigned to active tasks, then the operating system will swap out an active task, making it inactive, and swap in an inactive task making it active. If an MTA computer has multiple processors, then the operating system may assign multiple protection domains on different processors to the task. In this way, computations of the task can be executed simultaneously, not only on multiple streams on one processor, but also on multiple streams on multiple processors. The threads of execution of a task that are executing on one processor are referred to as a "team" of the task. Thus, a task comprises one or more teams, and each team comprises one or more threads of execution.

Each user program 220 includes user code 221 and a user runtime 222. The user code is the application-specific code of the user program, and the user runtime is code provided to assist the user program in managing the scheduling of threads to streams. The user runtime includes virtual processor code 223 and a thread list 224. The virtual processor code is responsible for deciding which thread to assign to the stream on which the virtual processor code is executing. When a task creates a stream, the virtual processor code is executed to select which thread should be assigned to that stream. When a thread completes, the virtual processor code also is executed to determine the next thread to assign to that stream. If threads are not currently available to assign to the stream, the virtual processor code may quit the stream so that the stream can be assigned to another task. The user runtime also provides standard trap handlers for handling various exceptions with a standard behavior. The user code can override the standard behaviors by providing customized trap handlers for various exceptions.

Task Swap Out

The processor scheduler of the operating system coordinates the allocation of the processor to the various tasks that are currently ready to be executed. As described above, each processor has 16 protection domains and can thus be simultaneously executing up to 15 tasks with the operating system being executed in the other domain. The processor scheduler allows each task to execute for a certain time quantum. When the time quantum expires for a task, the processor scheduler raises the domain_signal for the protection domain of that task to initiate a swap out for that task. The swapping in and swapping out of tasks requires cooperation on the part of the task. To swap out a task, the operating system asks the task to save its state and quit all its streams, but one. The one remaining stream then notifies the operating system that the state of the task has been saved and that another task can be swapped into that protection domain. If the task ignores the notification, then the operating system can abort the task.

The operating system notifies the task of the impending swap out by raising the domain_signal, which causes each stream of that task to trap (assuming the domain_signal trap is enabled) and to start executing its primary trap handler, whose address is stored in register T0. The primary trap handler saves the state of the thread executing on that stream and then invokes a domain_signal_handler routine. The task may be executing on multiple streams and on multiple processors. To ensure that the state of all executing threads are properly saved and that the task quits all its streams in an orderly manner, each team of the task designates one of the streams executing a thread of the task to be a team master stream, and the team master streams designate one of the team master streams to be a task master stream. In one embodiment, the team master stream is the thread that first increments a team master variable, and the task master stream is that team master stream that first notifies (or alternatively that last notifies) the operating system that its team is ready to be swapped out.

Each team master stream waits for all other streams of the team to quit and then performs some clean-up processing before notifying the operating system that all the other streams of the team have quit and that the team is ready to be swapped out. Analogously, the task master stream waits until all the team master streams have notified the operating system and performs some clean-up processing for the task before notifying the operating system that the task is ready to be swapped out. The team master streams and the task master stream notify the operating system by invoking an operating system call. The operating system then takes control of the last stream in each team and can start another task executing on that stream as part of swapping in that other task.

When the operating system eventually decides to swap in the task, the operating system returns from the operating system calls of the team master streams. A task master stream processes any Unix signals that have arrived and then releases all the other team master streams to restore the saved states. Each team master stream creates a stream for each thread that was running when the task was swapped out and sets the state of the created streams to the saved states of the threads.

Figure 3:
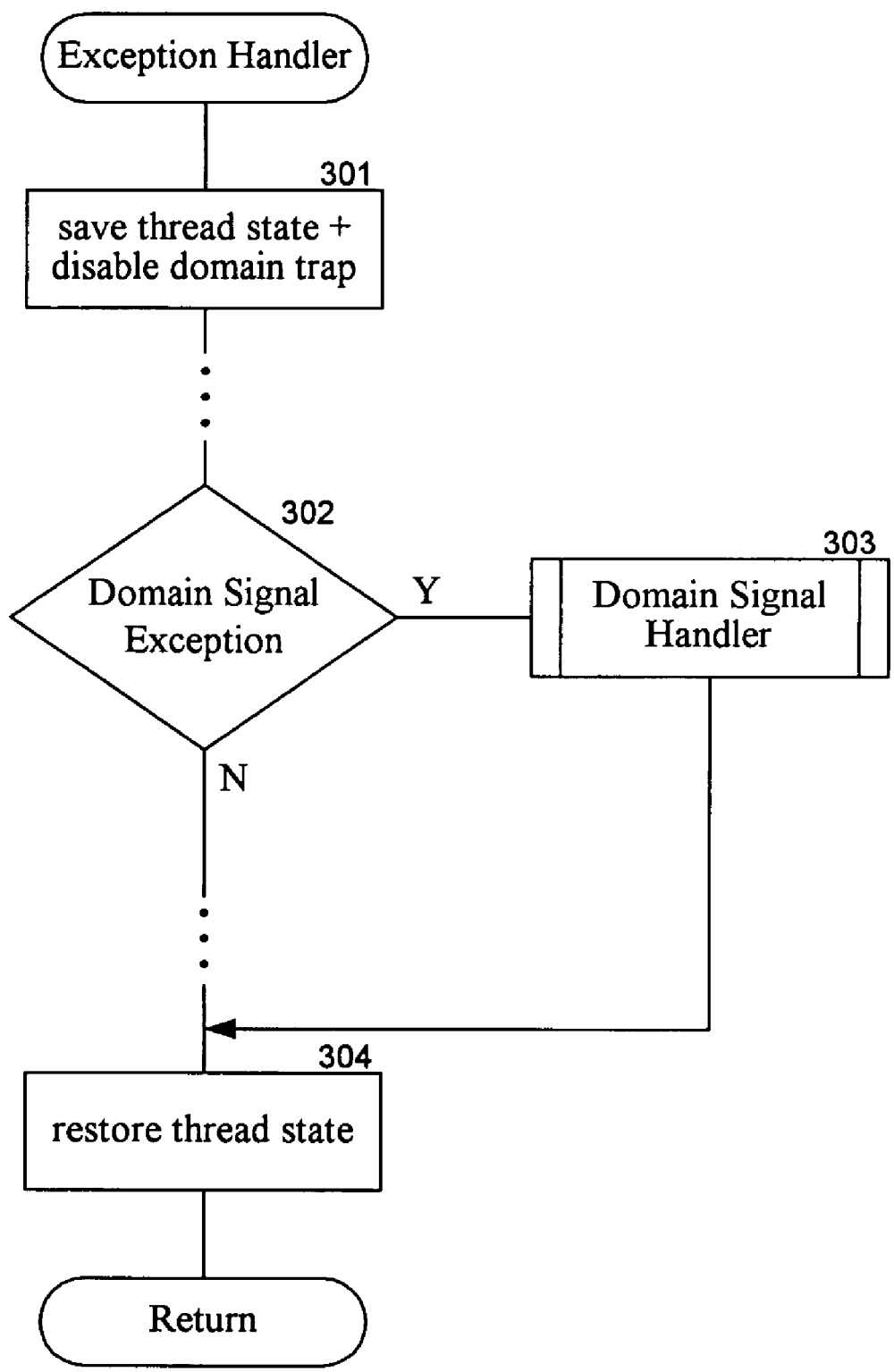
FIG. 3 is a flow diagram of the primary exception handler routine.
Figure 8:
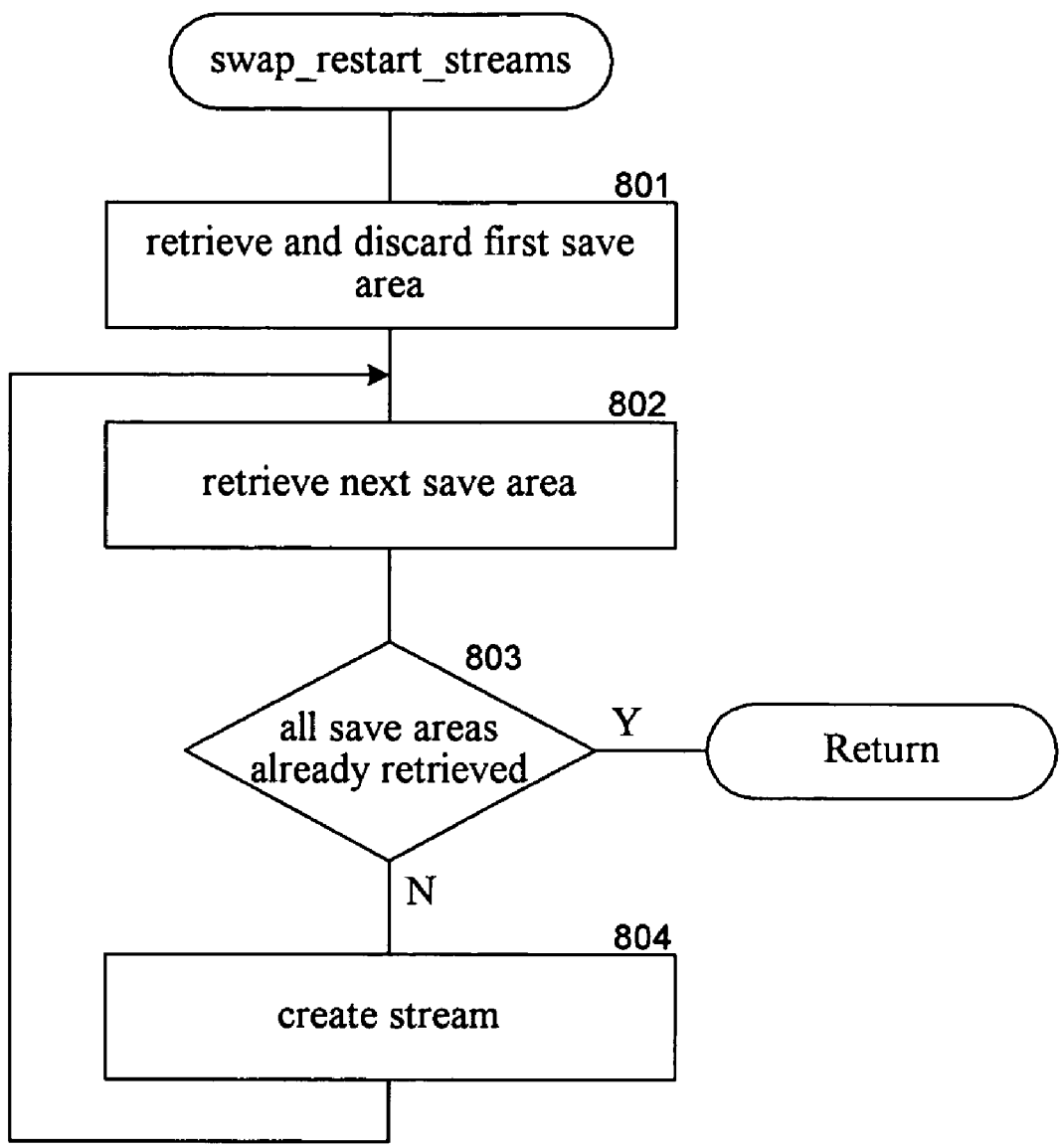
FIG. 8 is a flow diagram of the swap_restart_stream function.
Figure 9:
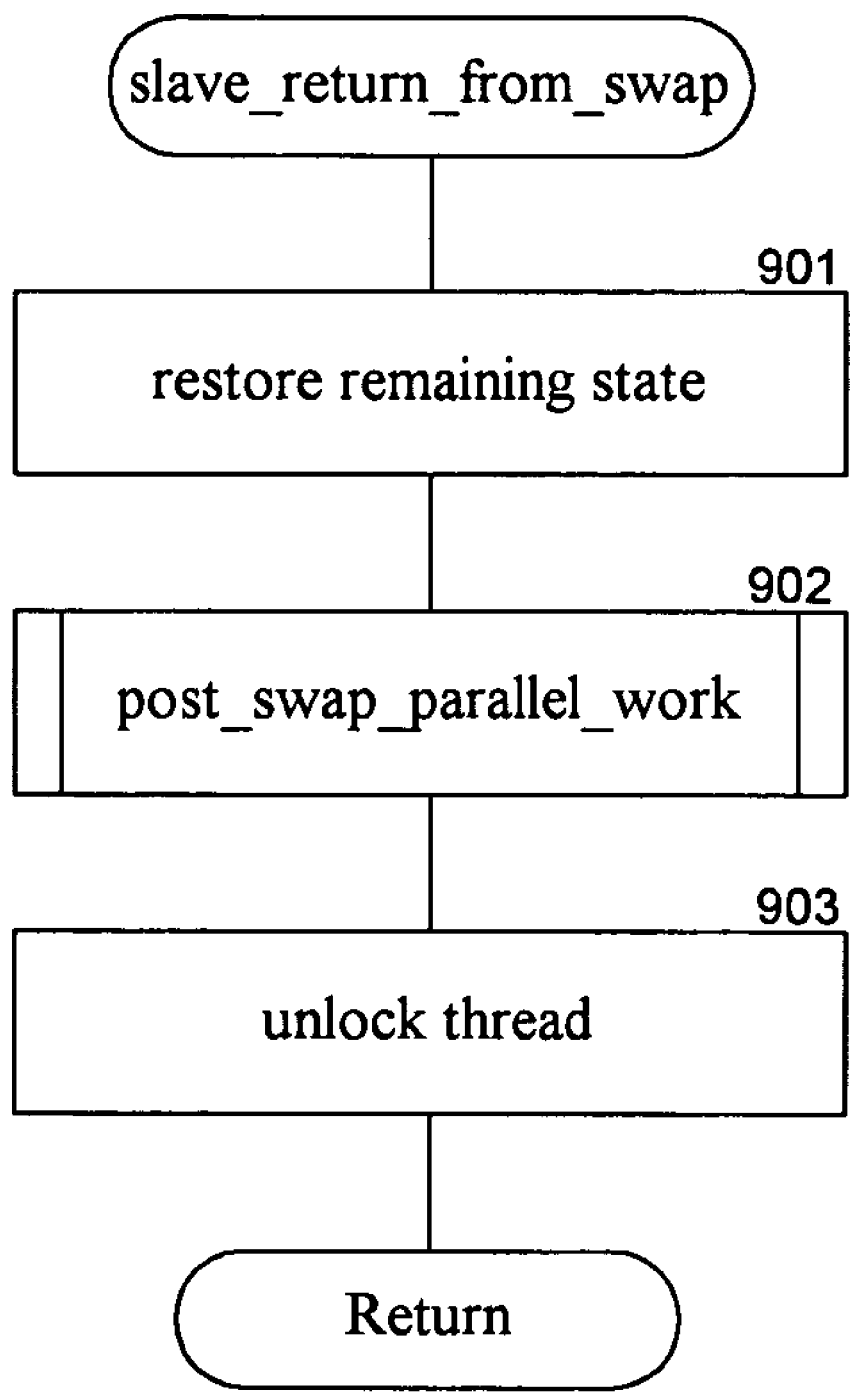
FIG. 9 is a flow diagram of the slave_return_from_swap routine.
Figure 10:
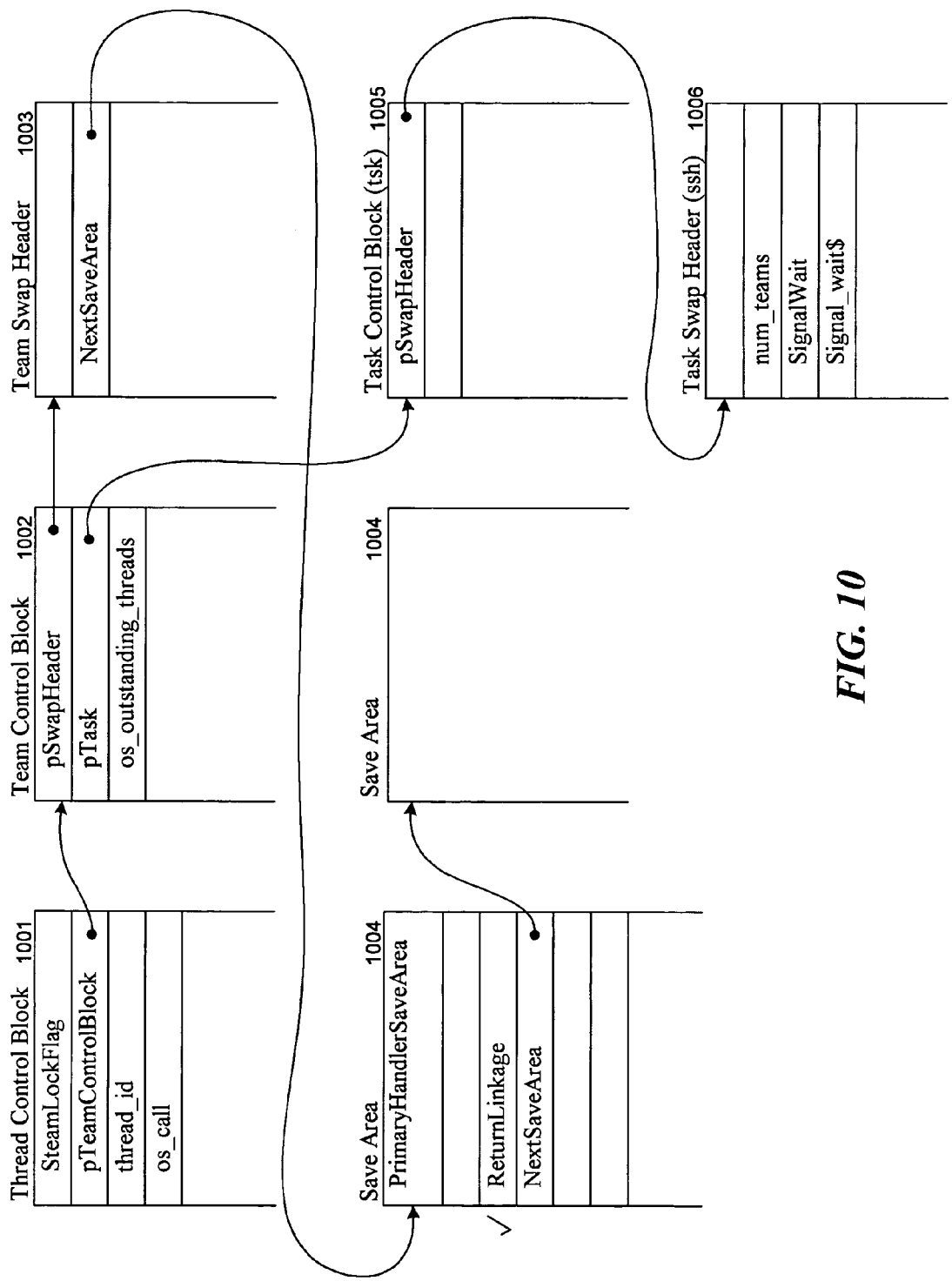
FIG. 10 is a block diagram of data structures used when swapping a task.

FIGS. 3-11 illustrate the saving and restoring of a task state when the task is swapped out and then swapped in. In one embodiment, this saving and restoring is provided by the user runtime, which is started when the domain_signal_handler routine is invoked. The data structures used when the task state is saved and restored are shown in FIG. 10. FIG. 3 is a flow diagram of the primary exception handler routine. The address of the primary exception handler routine is stored in register T0. The primary exception handler routine determines which exception has been generated and invokes an appropriate secondary exception handler to process the exception. In step 301, the routine saves the state of the thread in a save_area data structure and disables the domain signal trap. The primary exception handler may save only partial thread state information depending on the type of exception. For example, if the exception is a data blocked exception, then the primary exception handler may save very little state information so that the handling can be lightweight if the secondary handler decides to retry access to the blocked memory location. In step 302, if a domain_signal exception has been raised, then routine continues at step 303, else the routine continues to check for other exceptions. In step 303, the routine invokes the domain_signal_handler routine to process the exception. The domain_signal_handler routine returns after the task has been swapped out and then swapped in. In step 304, the routine restores the thread state and returns to the user code.

Figure 4:
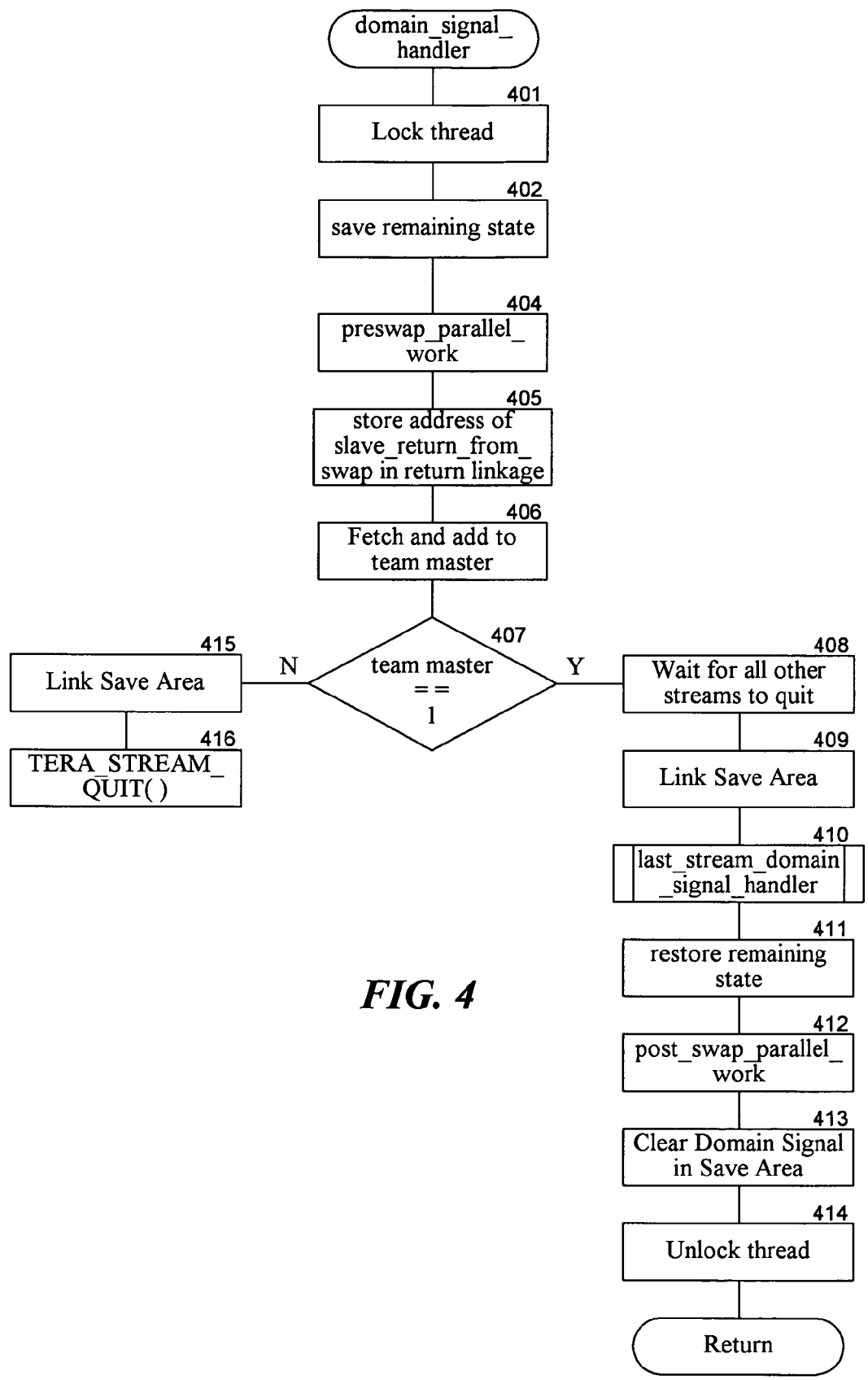
FIG. 4 is a flow diagram of the domain_signal_handler routine.

FIG. 4 is a flow diagram of the domain_signal_handler routine. This routine is invoked by the primary trap handler when the raising of the domain_signal caused the trap. The domain_signal of a protection domain is raised by the operating system when the operating system wants to swap out the task executing on that protection domain. The primary trap handler is executed by each stream in the protection domain and saves most of the state of the stream. This routine is passed a save_area data structure that contains that state. Each stream links its save_area data structure onto a linked list so that the state is available when the task is swapped in. If the stream is not a team master stream, that is, it is a slave stream, then the stream quits. If the stream is the team master stream, the routine then invokes the last_stream_domain_signal_handler routine, which does not return until the team master stream is swapped in. When that invoked routine returns, this routine returns to the primary trap handler, which restores, from the save_area data structure, the state of the stream at the time when the domain_signal was raised.

In step 401, the routine locks the thread. The locking of the thread means that the thread running on the stream will not give up the stream on a blocking call to the operating system or any other event such as a synchronization retry-limit exception. In step 402, the routine saves any remaining state that was not saved by the primary trap handler. In step 404, the routine invokes the preswap_parallel_work function to perform any necessary work for the running thread prior to swapping out the task. In step 405, the routine stores the address of the return point for this thread, upon swap in, in the return_linkage variable of the save_area data structure. In this embodiment, the address of slave_return_from_swap function is stored as the return point. In step 406, the routine fetches and adds to a team master variable. The first stream to fetch and add to the team master variable is the team master stream for the team. In step 407, if this stream is the team master stream, then the routine continues at step 408, else the routine continues at step 415. The team master stream executes steps 408-414. In step 408, the routine waits for all other streams within the team to quit. In step 409, the routine links the save_area data structure of the stream to the head of the linked list of save_area data structures. In step 410, the routine invokes the last_stream_domain_signal_handler routine. This invoked routine returns only after this thread starts running again after being swapped in. In step 411, the routine restores the remaining state that was saved in step 402. In step 412, the routine invokes the post swap_parallel_work function to perform any necessary work after the thread is swapped in. In step 413, the routine clears the domain_signal flag in the save_area data structure, so that the exception is cleared when the primary trap handler restores the state from the save_area data structure. In step 414, the routine unlocks the thread and returns to the primary trap handler. Steps 415 and 416 are executed by the slave streams. In step 415, the routine links the save_area data structure to the linked list. In step 416, the routine quits the stream, which means that the stream is available to be allocated to another task, such as the task to be swapped in.

Figure 5A:
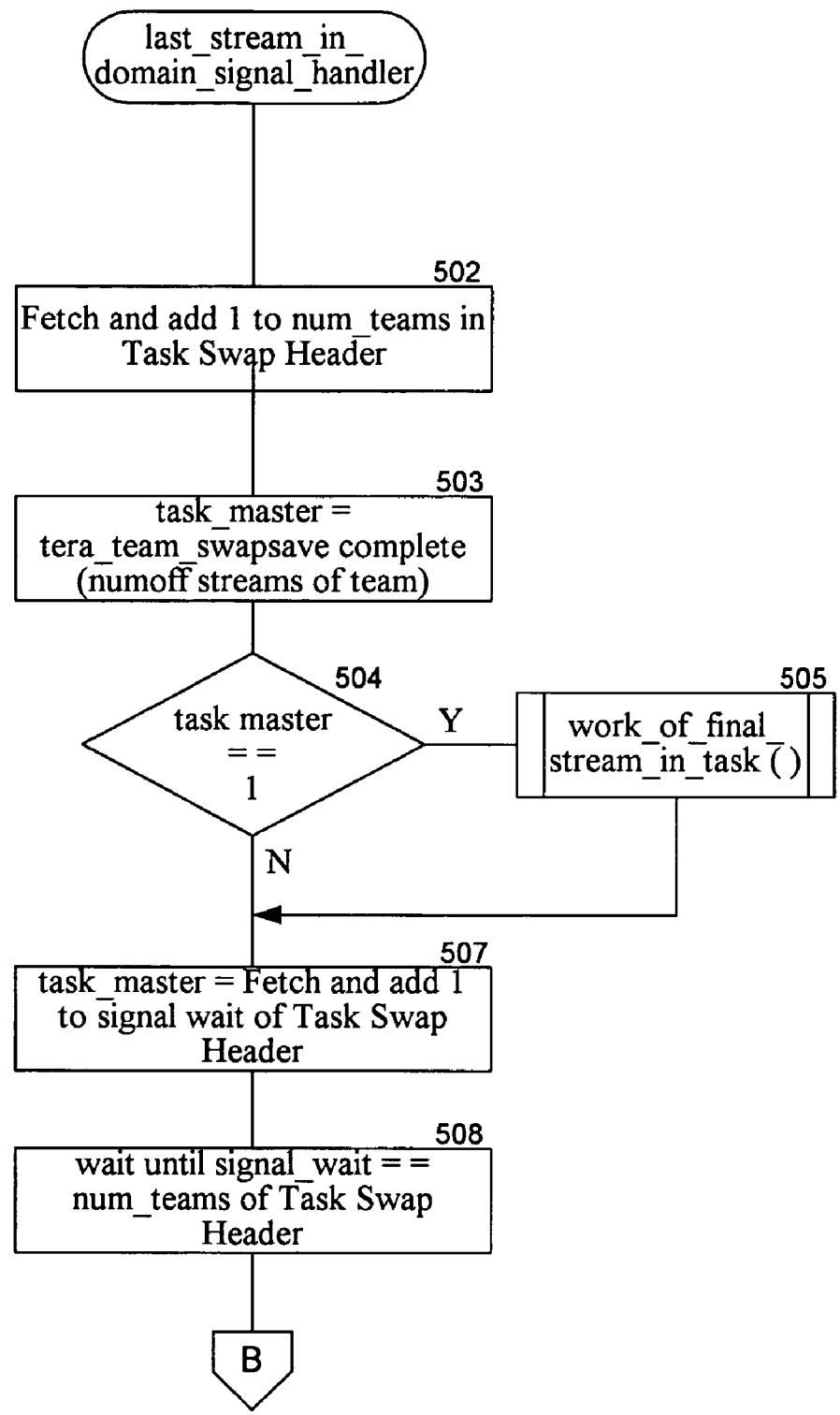
FIGS. 5A and 5B are flow diagrams of the last_stream_domain_signal_handler routine.
Figure 5B:
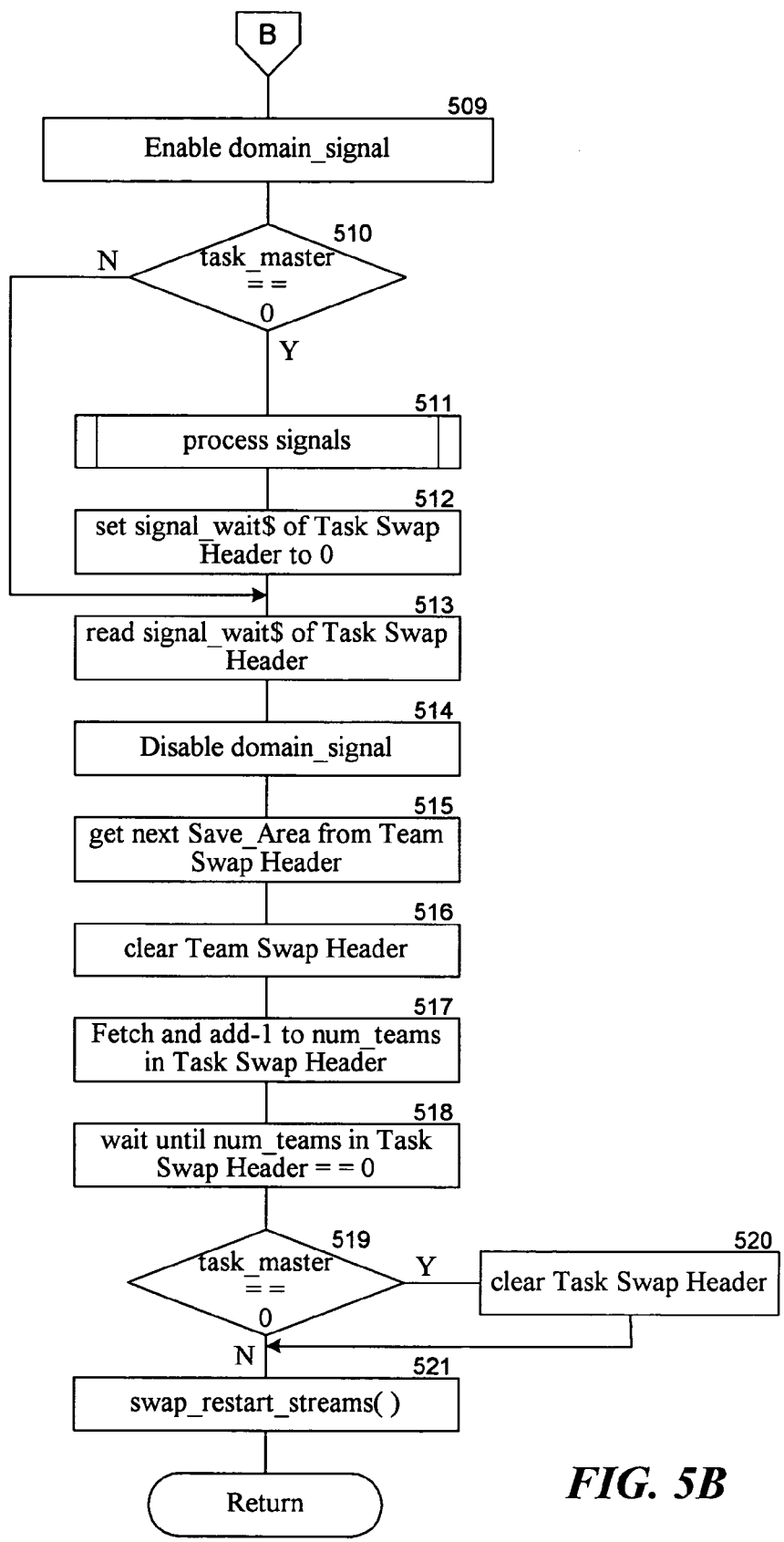

FIGS. 5A and 5B are flow diagrams of the last_stream_domain_signal_handler routine. This routine is invoked by the team master stream of each team. This routine increments a number of teams variable, which is then used for barrier synchronization when the task is swapped in. This routine then invokes an operating system call to notify the operating system that the team has completed saving its state and quitting the other streams. That operating system call does not return until the task is swapped back in, except for the call by the task master stream, which returns immediately. The task master stream is the last stream that makes this operating system call. The task master then performs an operating system call to notify the operating system that the task has completed saving its state. When swapped in, the first stream that fetches and adds to a signal wait variable is designated as the task master stream for the swap in. The task master stream creates a stream to process any Unix signals, and all the other team master streams wait until the Unix signal processing is complete. The routine then invokes a routine to restart the slave streams for the team.

In step 502, the routine fetches and adds to the num_teams variable in the task swap header data structure. In step 503, the routine invokes the tera_team_swapsave_complete operating system call passing the num_streams variable of the team swap header. This operating system call returns immediately when the last team master stream invokes it and returns as its return value a value of 1. For all other team master streams, this operating system call does not return until the task is swapped in. The last team master stream to invoke this operating system is designated as the task master stream. In step 504, if this stream is the task master stream, then the routine continues at step 505, else the routine continues at step 507. In step 505, the routine invokes the work_of_final_stream_in_task function. This invoked function does not return until the task is swapped in. Steps 507-521 represent processing that is performed when the task is swapped in. In steps 507-508, the routine fetches and adds a 1 to the signal_wait variable of the task swap header and waits until that variable equals the num_teams variable in the task swap header. Thus, each team master stream waits until all the other team master streams reach this point in the routine before proceeding. The first stream to increment the signal_wait variable is the task master stream for the swap in. Alternatively, the same stream that was designated as the task master for the swap out can also be the task master for the swap in. In steps 509-514, the routine enables trapping for the domain_signal so that subsequent raising of the domain_signal will cause a trap. The task master stream then processes the Unix signals. During the processing of Unix signals, another domain_signal may be raised. Thus, another swapout can occur before the states of the streams are completely restored. The trap handler handling the domain_signal can handle nested invocations in that the trap handler can be executed again during execution of the trap handler. Therefore, an array of team and swap header data structures is needed to handle this nesting. In step 509, the routine enables the trapping of the domain_signal. In step 510, if this stream is the task master stream, then the routine continues at step 511, else routine continues at step 513. In step 511, the routine invokes the process_signals function to process the Unix signals. In one embodiment, the task master stream creates a thread to handle the Unix signals. In step 512, the routine sets the signal_wait$ synchronization variable of the task swap header to zero, in order to notify the other team master streams that the processing of the Unix signals is complete. In step 513, the routine waits for the notification that the task master stream has processed the Unix signals. In step 514, the routine disables the domain_signal to prevent nested handling of domain_signals. The first save_area data structure in the linked list contains the state of team master stream when the task was swapped out. In step 515, the routine gets the next save_area data structure from the team swap header. In step 516, the routine clears the team swap header. In steps 517 and 518, the routine fetches and adds a −1 to the num_teams variable in the task swap header and waits until that variable is equal to 0. Thus, each team master stream waits until all other team master streams reach this point in the processing. Thus, these steps implement a synchronization barrier. One skilled in the art would appreciate that such barriers can be implemented in different ways. In step 519, if this stream is the task master stream, then the routine continues at step 520, else routine continues at step 521. In step 520, the routine clears the task swap header, to initialize it for the next swap out. In step 523, the routine invokes the swap_restart_streams function to restart the slave streams of the team by creating streams, retrieving the save_area data structures, and initializing the created streams. This routine then returns.

Figure 6:
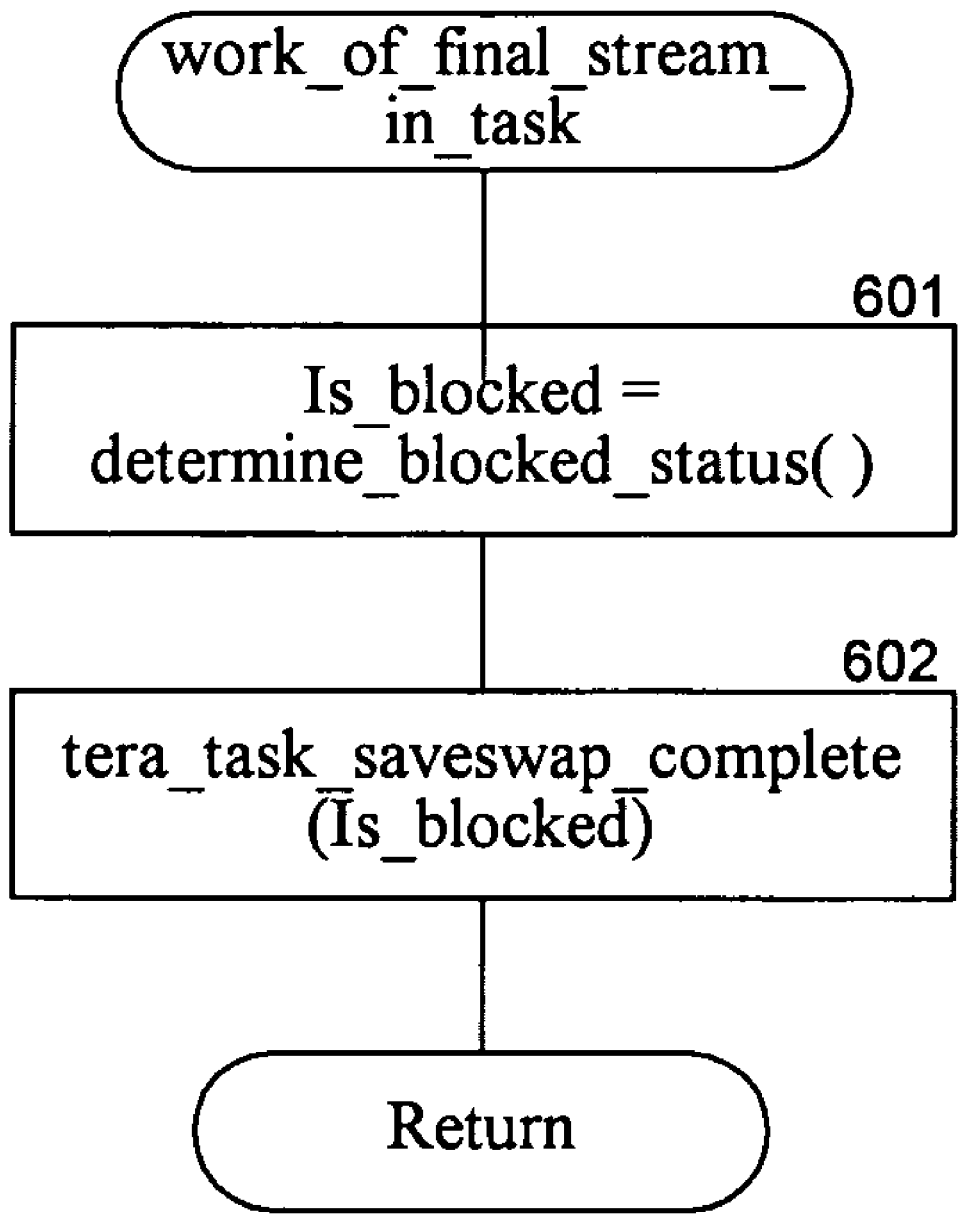
FIG. 6 is a flow diagram of the work_of_final_stream_in_task function.

FIG. 6 is a flow diagram of the work_of_final_stream_in_task function. This function determines whether the task is blocked and performs an operating system call to notify the operating system that the task has completed its save processing prior to being swapped out. The routine passes to the operating system call the indication of whether the task is blocked. If the task is blocked, the operating system can decide not to schedule this task until an external event occurs that would unblock this task. In this way, the operating system can allocate the resources of the processors to other tasks that are not blocked. A task is blocked when it is waiting only on an external event. In one embodiment, a task is considered blocked when all the streams of the task are executing the virtual processor code and the stream is not in the process of starting a thread, when no threads are ready to execute. However, other criteria can be used to determine whether a task is blocked. For example, the virtual processor code can increment a counter when it determines that it is blocked and when that counter equals the number of streams of the task, then the task can be considered to be blocked. More generally, a task can notify the operating system whenever it becomes blocked so that the operating system can decide whether to swap out the task. In step 601, the routine determines whether the task is blocked. In step 602, the routine invokes the tera_task_saveswap_complete operating system call passing an indication of whether the task is currently blocked. This invocation of the operating system call does not return until the task is swapped in. The routine then returns.

Figure 7:
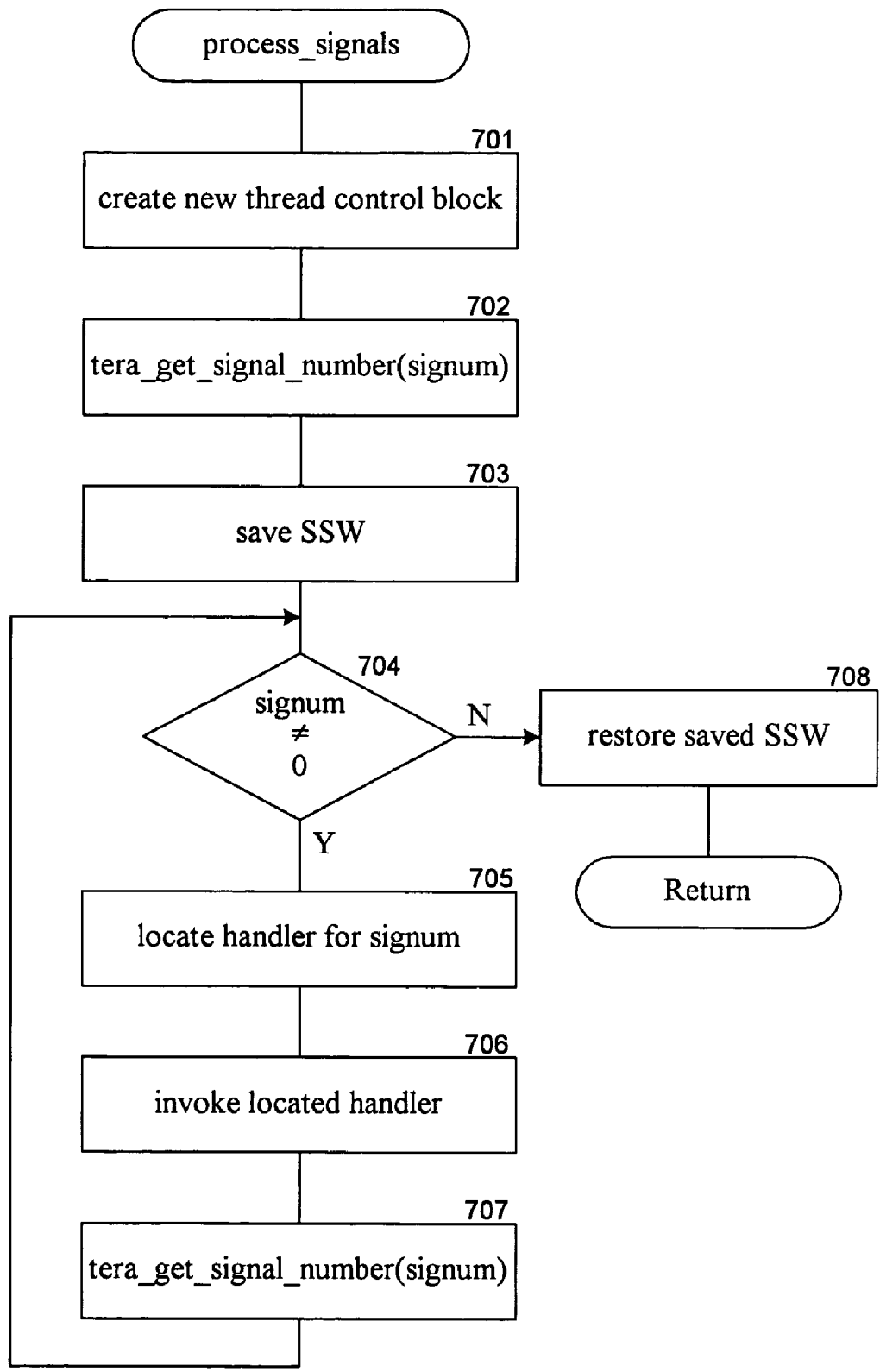
FIG. 7 is a flow diagram of the process_signals function.

FIG. 7 is a flow diagram of the process_signals function. This function loops retrieving and processing each Unix signal. The user program may have registered with the user runtime customized signal handlers for processing the various Unix signals. In step 701, the function creates a thread control block for a new thread that is to process the Unix signals. In step 702, the function invokes the tera_get_signal_number operating system call. This operating system call returns the value of the signal number in the sig_num variable. If there are no Unix signals left to be handled, then this operating system call returns a 0. In step 703, the function saves the stream status word (SSW). In steps 704-708, the function executing in the new thread loops processing each signal. In step 704, if the sig_num variable is not equal to zero, then the function continues at step 705, else the function continues at step 708. In step 705, the function locates the handler for the returned signal number. In step 706, the function invokes the located handler. In step 707, the function invokes the tera_get_signal_number operating system call to retrieve the next signal number and loops to step 704. In step 708, the function restores the saved SSW and returns.

FIG. 8 is a flow diagram of the swap_restart_stream function. This function creates a stream for each of the threads that were executing when the stream was swapped out and restarts the thread executing in that stream. In step 801, the function retrieves and discards the first save_area data structure in the linked list. The first save_area data structure is the data structure for the team master stream, which uses the stream provided by the operating system upon return from the tera_team_swapsave_complete operating system call of the team master stream. In steps 802-806, the function loops creating a stream for each save_area data structure in the link list. In step 802, the function retrieves the next save_area data structure in the linked list. In step 803, if all the save_area data structures have already been retrieved, then the function returns, else the function continues at step 804. In step 804, the function creates a stream. The function loops to step 802 to retrieve the next save_area data structure. The newly created stream initializes the thread based on the retrieved save_area data structure and executes at the slave_return_from_swap address that was stored in the save_area data structure before the task was swapped out.

FIG. 9 is a flow diagram of the slave_return_from_swap routine. This routine is invoked when the slave stream is created when the task is swapped in. This routine returns to the primary trap handler at a point after the invocation of the domain_signal_handler routine. In step 901, the routine restores the remaining state that was stored during the saving before the swap out. In step 902, the routine invokes the post_swap_parallel_work_routine to perform any application-dependent work upon swap in. In step 903, the routine unlocks the thread and returns to the routine that called the domain_signal_handler routine.

FIG. 10 is a block diagram of data structures used when swapping a task. Each thread has a thread control block 1001 that contains information describing the current state of the thread and points to a team control block 1002 of the team of which the thread is a member. The team control block contains information describing the team and points to a task control block 1005 of the task of which the team is a member. The task control block contains information describing the task. The team control block contains a pointer to a team swap header 1003 that contains information relating to the swapping of the team. The team swap header contains a pointer to a linked list of save_area data structures 1004 that are used to restart the threads when the team is swapped in. The task control block contains a pointer to a task swap header 1006. The task swap header contains information relating to the swapping of the task.

Operating System/Runtime Interface

The operating system implements operating system calls that are provided to the user programs. When an operating system call is invoked, it begins executing on the same stream on which the invoking thread was executing. Certain operating system calls may be of indefinite duration. For example, an operating system call to return user input will not return until the user eventually inputs data. While the operating system call is waiting for user input, the user program can continue executing its other threads on its other streams. However, the user program effectively has one less stream on which to execute threads, because one of the streams is blocked on the operating system call.

To prevent this "taking" of a stream from the user program during a blocking operating system call, the operating system and the user runtime implement an upcall protocol to return the stream to the user program while the operating system call is blocked. An "upcall" occurs when the operating system invokes a function of the user program. The user program, typically the user runtime of the application program, can register special purpose functions with the operating system, so that the operating system knows which functions to invoke when it makes an upcall to the user program. To support the returning of a stream that is blocked in an operating system call, the user runtime registers a "rt_return_vp" function and a "rt_return_thread" function with the operating system.

When an operating system call that will block is invoked, the operating system (executing on the stream that invoked the operating system call) invokes the rt_return_vp function of the user program. This invocation returns the stream to the user program. The virtual processor code of the user program can then select another thread to execute on that stream while the operating system call is blocked. Eventually, the operating system call will become unblocked (e.g., the user has finally input data). When the operating system call becomes unblocked, the operating system (executing on one of its own streams) invokes the rt_return_thread function of the user program to notify the user program that the operating system call has now completed. The rt_return_thread function performs the necessary processing to restart (or at least schedule) the thread that was blocked on the operating system call. The rt_return_thread function then invokes the tera_return_stream operating system call to return the stream to the operating system. A malicious user program could decide not to return the stream to the operating system and instead start one of its threads executing on that stream. Thus, a user program could increase the number of streams allocated to it to an amount greater than the slim value set the operating system. The operating system can mitigate the effects of such a malicious user program by not returning any more streams or, alternatively, killing the task when it detects that the user program has failed to return a certain number of the operating system streams.

Figure 11:
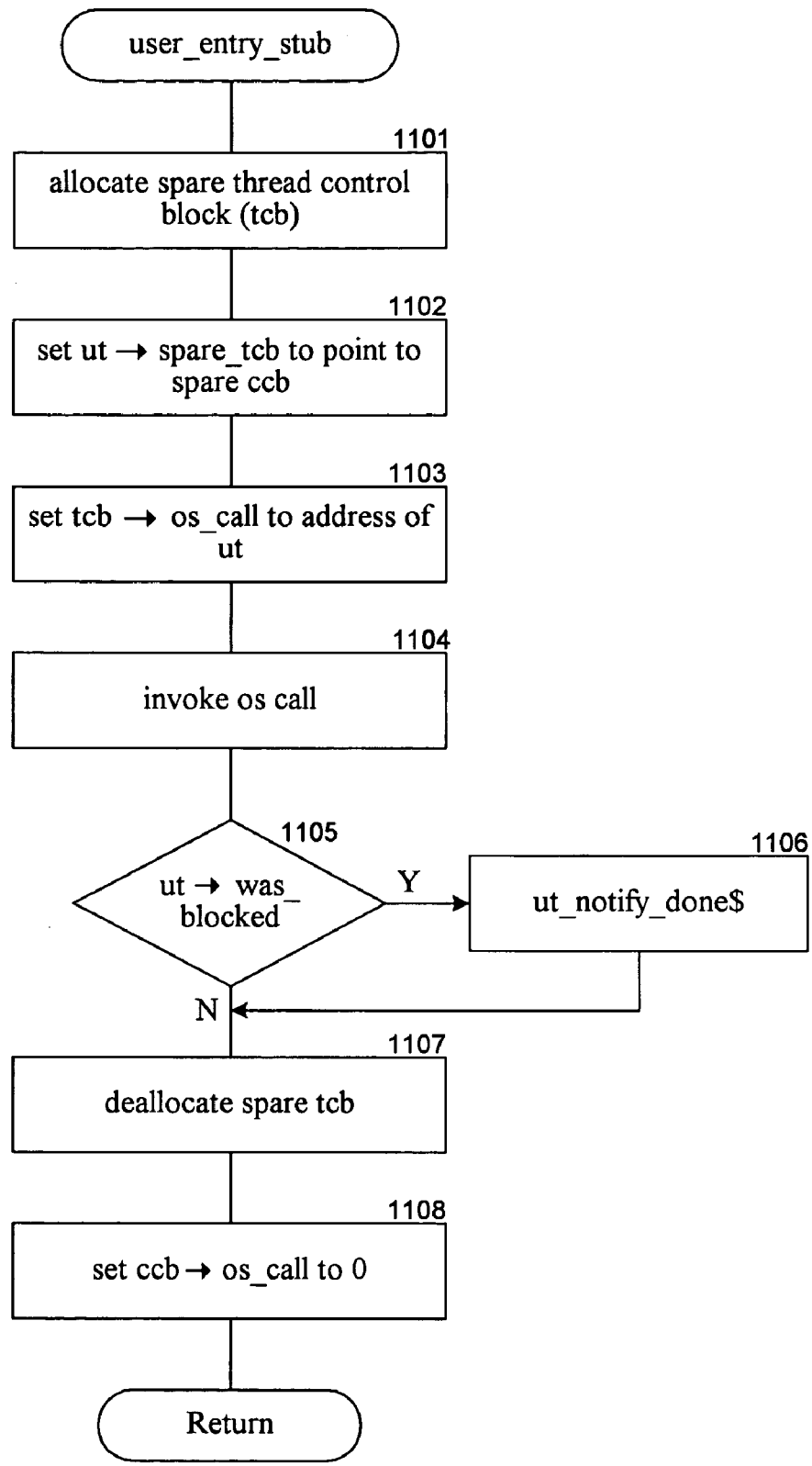
FIG. 11 is a flow diagram of the user_entry_stub routine.

FIGS. 11-16 illustrate the returning of a stream to a user program when an operating system call blocks. In one embodiment, this processing is performed by the user runtime. FIG. 11 is a flow diagram of the user_entry_stub routine. This routine is a wrapper routine of an operating system call. This routine allocates a thread control block and then invokes the operating system call passing that thread control block. A new thread control block is needed because the rt_return_vp function and the rt_return_thread function may be executing at the same time on different streams. In particular, the rt_return_vp function may be executing in the stream returned by the operating system, and the rt_return_thread function may be executing in the operating system stream. Thus, the rt_return_vp function is bound to this newly allocated thread control block. When the operating system call returns, this routine waits until the operating system stream is returned to the operating system and then deallocates the thread control block and returns. In step 1101, the routine allocates a spare thread control block. In step 1102, the routine sets the spare_thread_control_block variable in the upcall transfer ("ut") data structure to point to this spare_thread_control_block. The ut data structure, described below in detail, contains information and synchronization variables that support the return of a stream to the user programs. In step 1103, the routine sets the os_call variable of the thread control block that is not the spare thread control block to point to the address of the ut data structure. In step 1104, the routine enters the operating system passing the os_call variable to invoke the operating system call. In step 1105, upon return, if the operating system call was blocked, as indicated by the was_blocked variable of the ut data structure, then the routine continues at step 1106, else the routine continues at step 1107. In step 1106, the routine reads from the notify_done$ synchronization variable of the ut data structure. The full/empty bit of this synchronization variable is initially set to empty. The routine waits on this synchronization variable until the operating system call writes to it so that its full/empty bit is set to full, indicating that the operating system stream has been returned. In step 1107, the routine then deallocates the spare thread control block. In step 1108, the routine writes a 0 into the os_call variable of the thread control block and returns.

Figure 12:
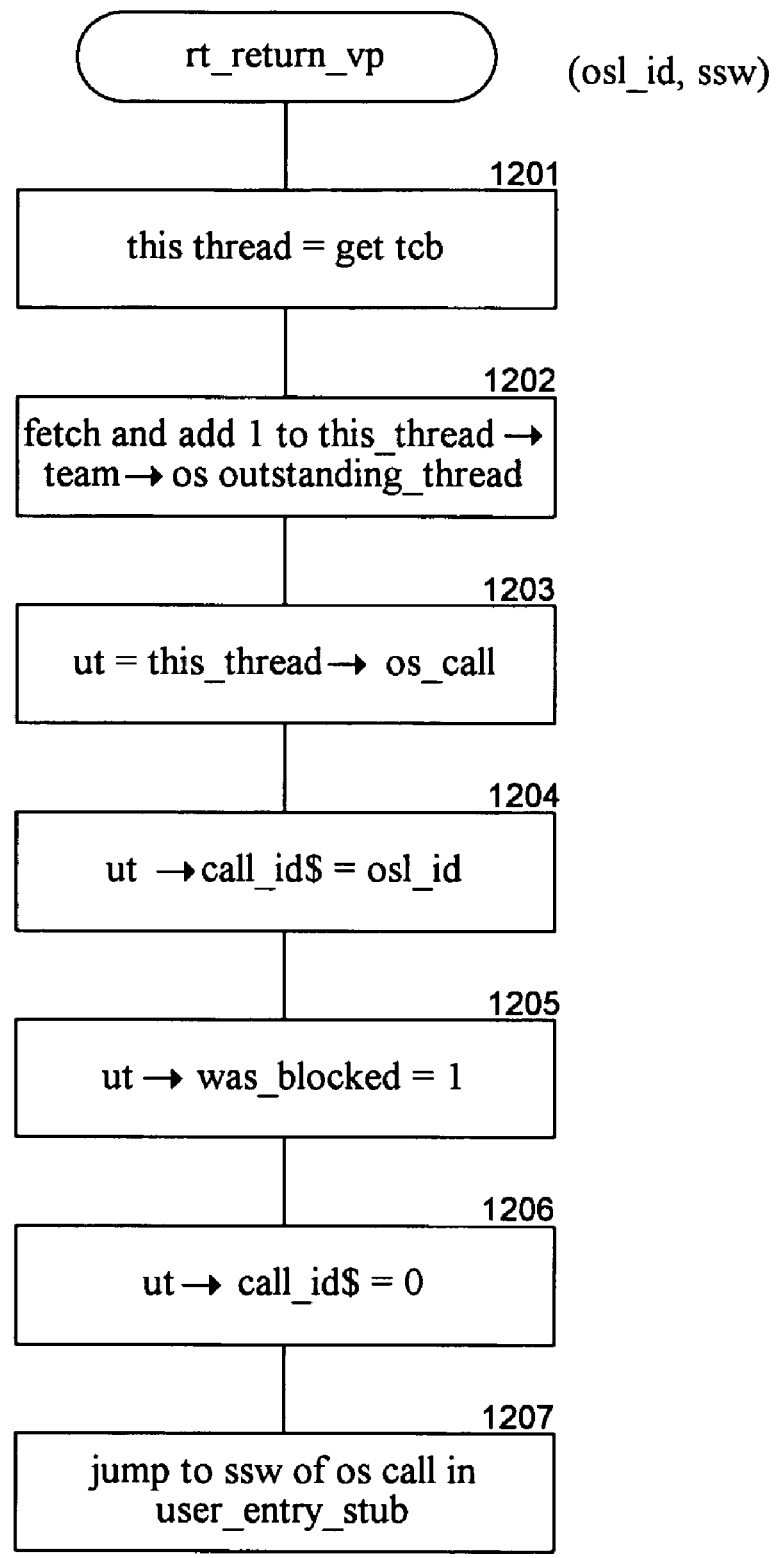
FIG. 12 is a flow diagram of the rt_return_vp function.

FIG. 12 is a flow diagram of the rt_return_vp function. This function is invoked by the operating system to return a stream to the user program that invoked a blocking operating system call. This function is passed the identification of the thread that invoked the blocking operating system call and its stream status word (SSW). In step 1201, the function receives the thread control block for this thread. In step 1202, the function increments the os_outstanding_threads variable of the team control block for this thread. This variable is used to keep track of the number of threads that are blocked in operating system calls. In step 1203, the function sets the ut pointer to the value in the os_call variable of the thread control block, which was set in the user_entry_stub routine. In step 1204, the function writes the passed identification of the thread into the call_id$ synchronization variable of the ut data structure. This sets the full/empty bit of the synchronization variable to full possibly after blocking. The call_id$ synchronization variable is used by the thread executing on the stream. The thread will spin in step 1206, attempting to write to the call_id$ synchronization variable. This spinning will wait until the full/empty bit of the synchronization variable is set to empty. When the predefined number of retry writes have been tried to the call_id$ synchronization variable in step 1206, a data blocked exception is raised. The trap handler for that exception determines whether the stream is locked. When a stream is locked by a thread, no other thread can execute on the stream. If the stream is locked, the trap handler returns to retry writing to the call_id$ synchronization variable. Thus, if the stream is locked, this thread will spin, waiting until the full/empty bit of this synchronization variable is set to empty when the operating system call completes. If, however, the stream is not locked, the trap handler places this thread on a blocked list and invokes the virtual processor code to schedule another thread to execute on this stream. In step 1205, the function sets the was_blocked flag of the ut data structure so that the user_entry_stub routine will know whether to wait for the operating system stream to be returned to the operating system before the spare thread control block can be released. In step 1206, the routine writes a value of 0 into the call_id$ synchronization variable of the ut data structure. Since the full/empty bit of this synchronization variable was set to full in step 1204, step 1206 retries the write until the full/empty bit is empty or a data blocked exception is raised as described above. In step 1207, the function returns to the user_entry_stub at the return point from the operating system call.

Figure 13:
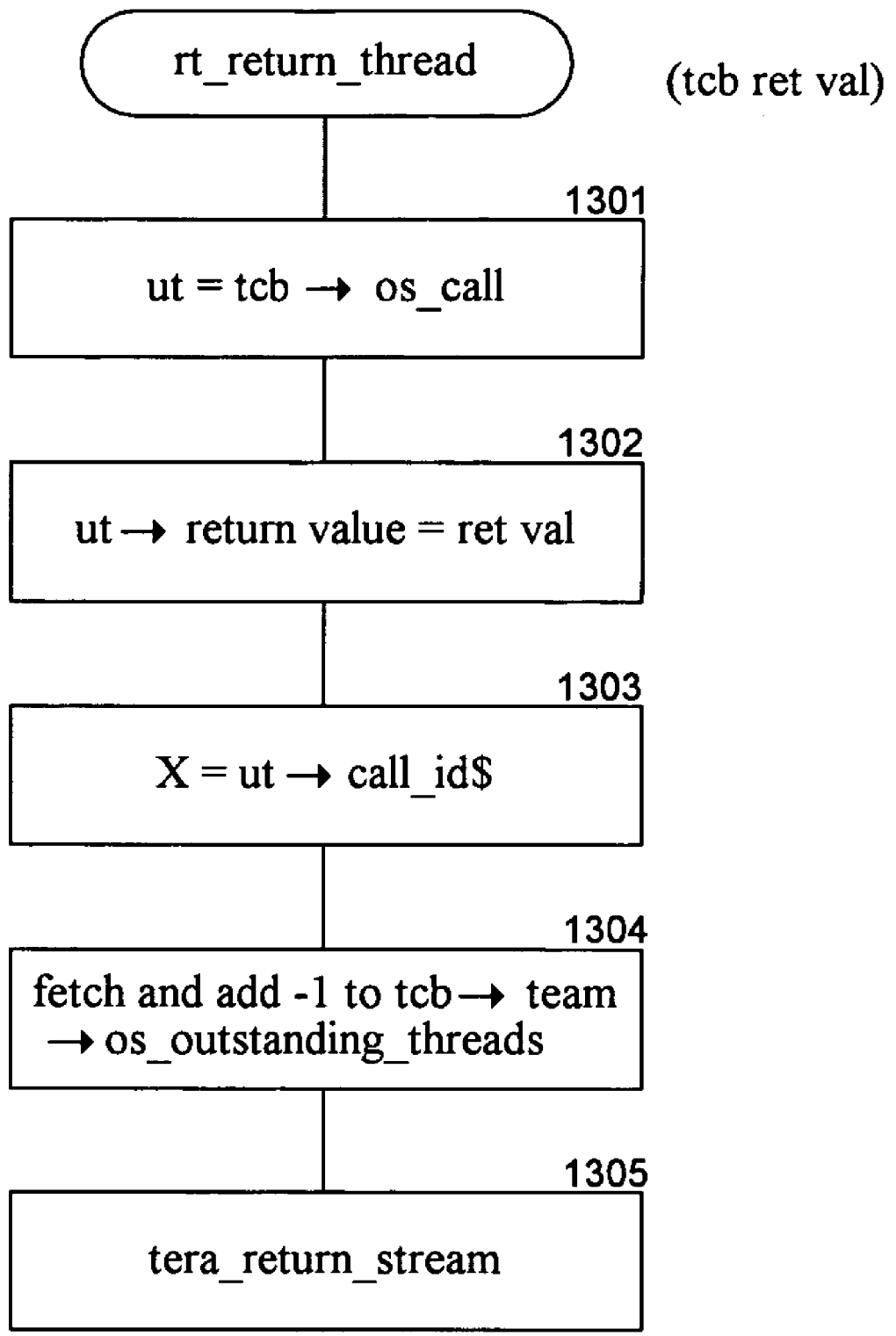
FIG. 13 is a flow diagram of the rt_return_thread function.

FIG. 13 is a flow diagram of the rt_return_thread function. This function is invoked by the operating system to notify a user program that a thread that was blocked on an operating system call is now unblocked. This function is passed the thread control block of the blocked thread and a return value of the operating system call. In step 1301, the function sets the ut pointer to the value in the os_call variable of the thread control block. In step 1302, the function sets the return_value variable of the ut data structure to point to be passed return value. In step 1303, the function reads the call_id$ synchronization variable, which sets the full/empty bit of the synchronization variable to empty and allows the write in step 1206 to proceed. In step 1304, the function fetches and adds a −1 to the os_outstanding_threads variable of the team control block for the thread. This allows the team to keep track of the number of threads that are blocked on an operating system call. A team will not be swapped out while an operating system call from a stream on that team is blocked. In step 1305, the function invokes the tera_return_stream operating system call to return this stream to the operating system.

Figure 14:
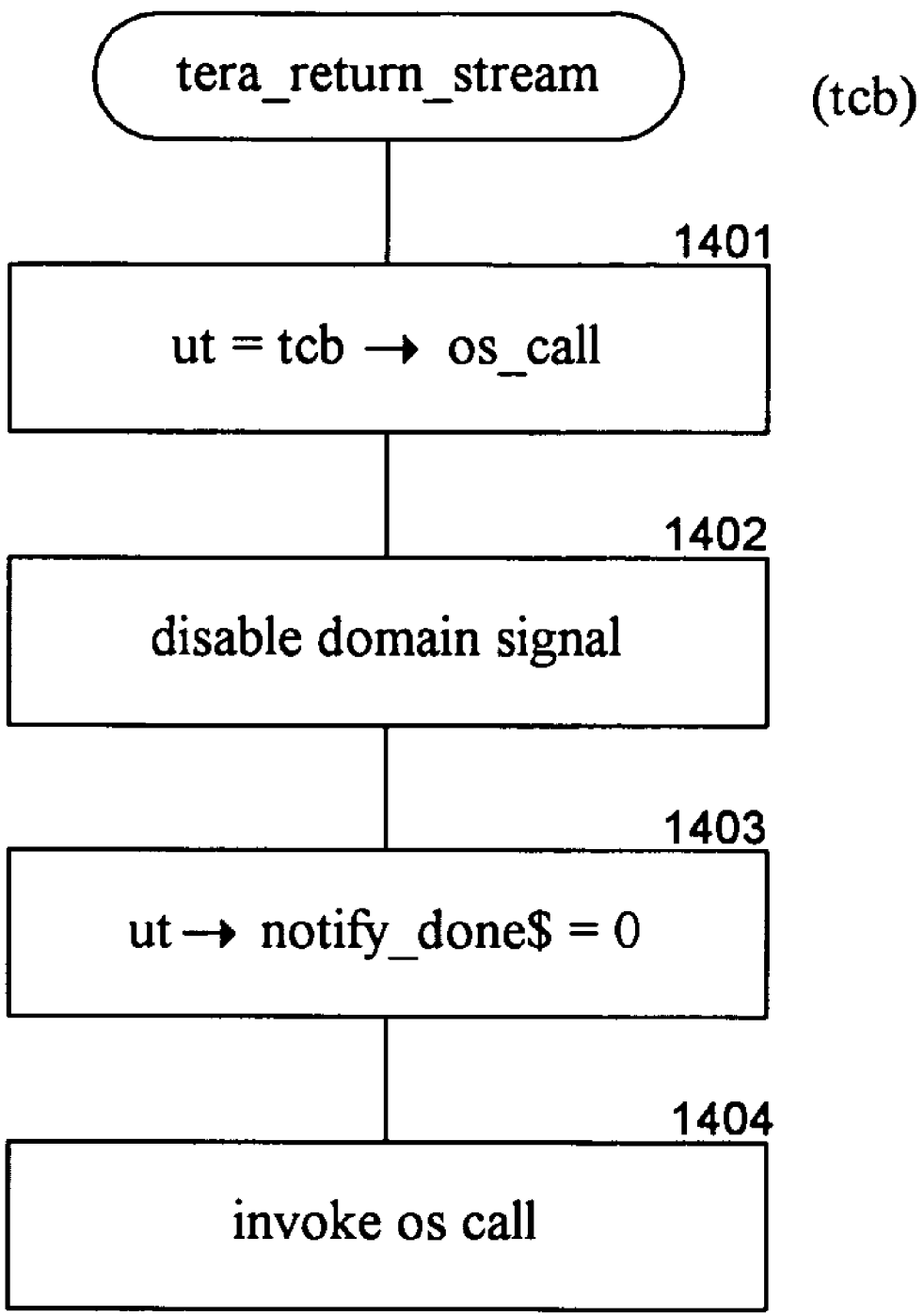
FIG. 14 is a flow diagram of the tera_return_stream operating system call.

FIG. 14 is a flow diagram of the tera_return_stream operating system call. This routine is invoked to return the operating system stream that was used to notify the user program of the completion of an operating system call. This operating system call is passed a thread control block. In step 1401, the operating system call sets the ut pointer to the os_call variable in the thread control block. In step 1402, the operating system call disables trapping of the domain_signal exception. In step 1403, the operating system call writes a value of 0 to the notify_done$ synchronization variable of the ut data structure, which notifies the user_entry_stub routine that the operating system stream has been returned. In step 1404, the operating system invokes an operating system call to effect the returning of the stream to the operating system.

Figure 15:
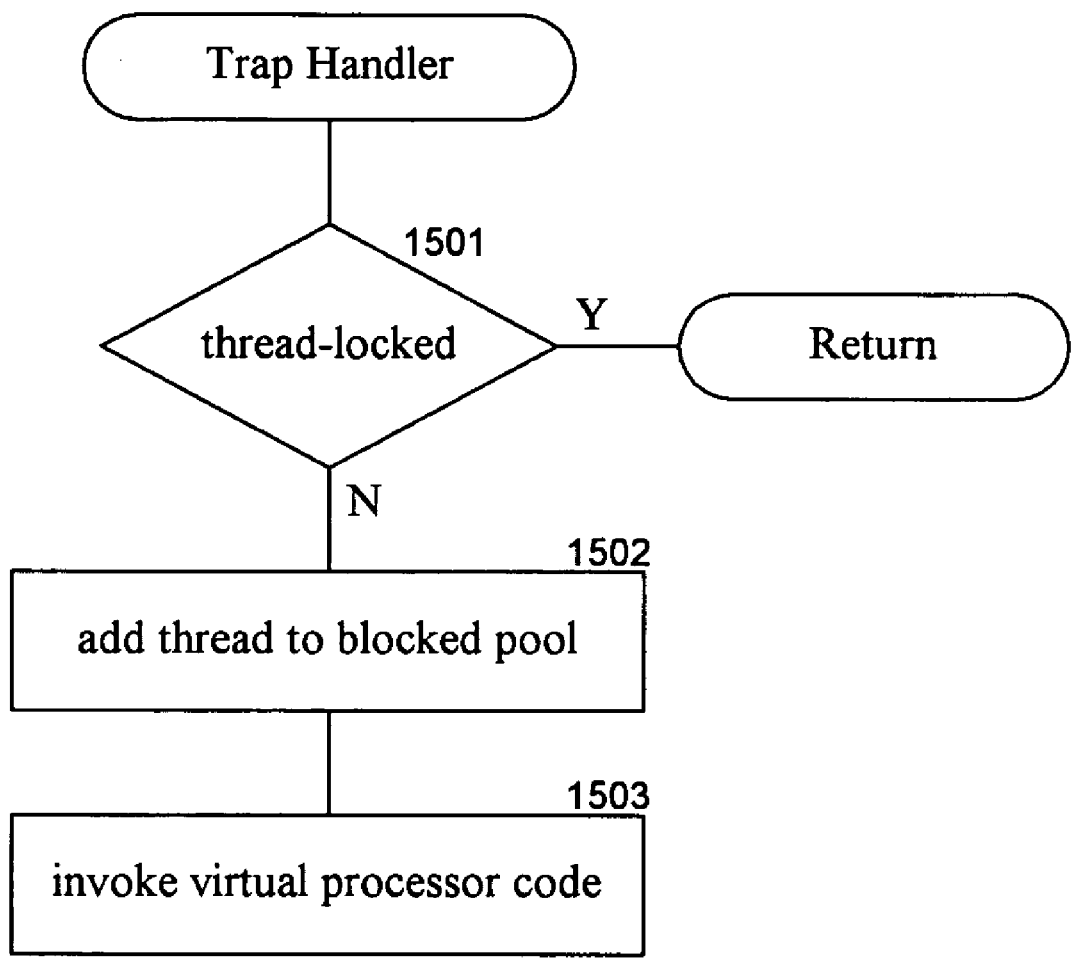
FIG. 15 is a flow diagram of a trap handler routine for handling data blocked exceptions that are raised when waiting for an operating system call to complete.

FIG. 15 is a flow diagram of a trap handler routine for handling data blocked exceptions that are raised when waiting for an operating system call to complete. The exception is raised by step 1206 of the rt_return_vp function. In step 1501, if the stream is locked, then the routine returns, else the routine continues at step 1502. In step 1502, the routine adds the thread to a list of blocked threads. In step 1503, the routine starts the virtual processor code for this stream so that another thread can start executing.

Figure 16A:
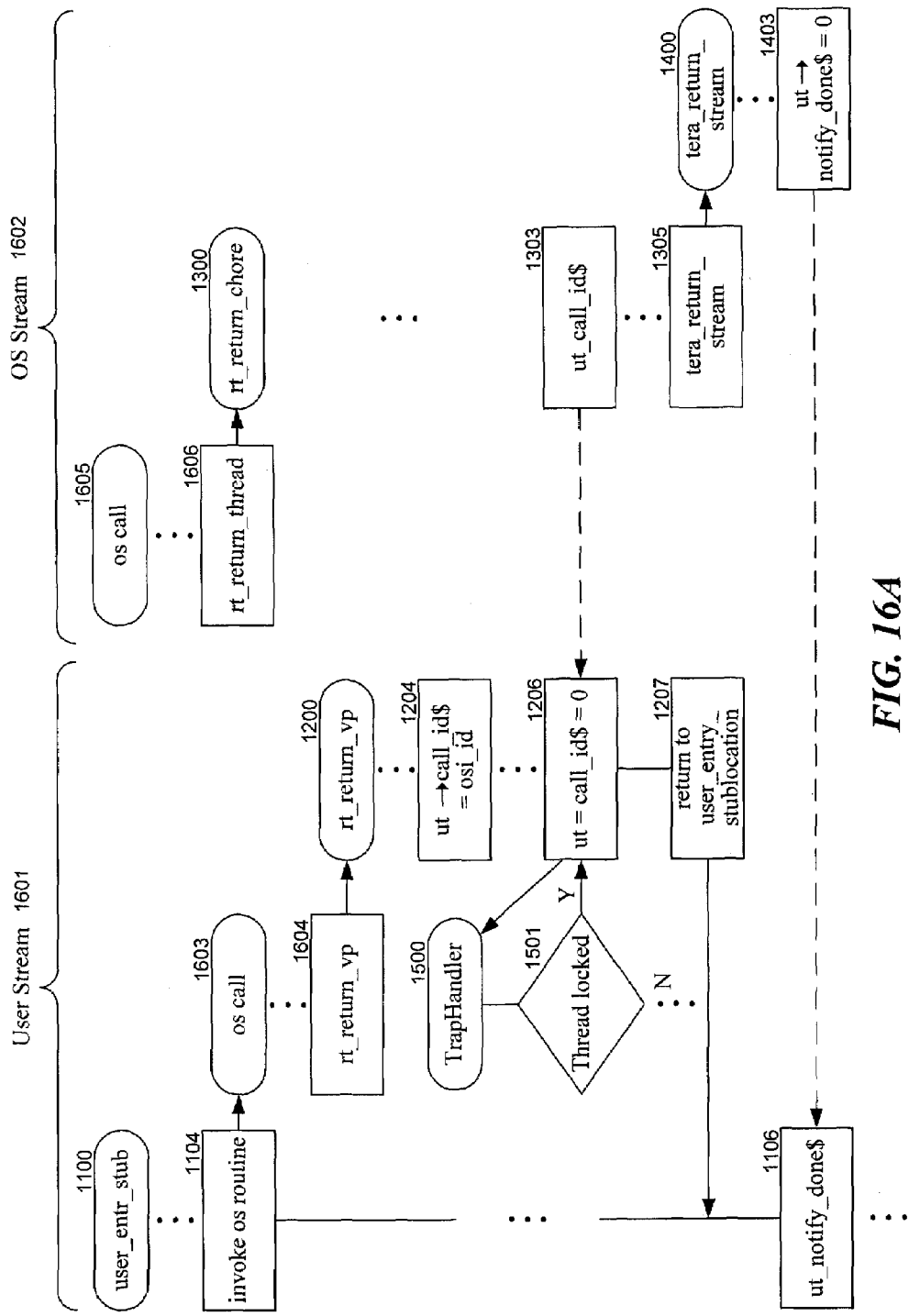
FIG. 16A is a diagram illustrating the synchronization of the user program and the operating system when the user program invokes an operating system call that blocks.

FIG. 16A is a diagram illustrating the synchronization of the user program and the operating system when the user program invokes an operating system call that blocks. The diagram illustrates the processing performed by the user stream 1601 and the processing performed by an operating system stream 1602. The solid lines with arrows indicate flow of control from one routine within a stream to another routine within the same stream. The dashed lines indicate the interaction of the synchronization variables. The ellipses indicate omitted steps of the functions. The user program invokes an operating system call by invoking the user_entry_stub routine 1100. That routine in step 1104 invokes the operating system call. As indicated by the solid line between steps 1104 and 1603, the user stream starts executing the operating system call. The operating system call 1603 invokes the rt_return_vp function in step 1604. The rt_return_vp function 1200 stores a value the call_id$ synchronization variable in step 1204, which sets the full/empty bit of the synchronization variable to full. The rt_return_vp function then writes a value into the call_id$ synchronization variable in step 1206. Since the call_id$ synchronization variable just had a value stored in it, its full/empty bit is set to full. This write cannot succeed until the full/empty bit is set to empty. Thus, step 1206 will cause data blocked exception to be raised and the trap handler routine 1500 will be invoked. In step 1501, if the thread is locked, then the trap handler returns to the blocking synchronization write in step 1206. For a locked stream, the process of raising a data blocked exception and returning for a locked thread will continue until the full/empty bit of the call_id$ synchronization variable is set to empty when the operating system call completes. If, however, the thread is not locked, then the trap handler routine places the thread on the blocked pool and executes the virtual processor code to select another thread to execute on that stream. When the operating system call 1605 completes, the operating system in step 1606 invokes the rt_return_thread function 1300 of the user program. This invocation is within a stream allocated to the operating system. The rt_return_thread function 1300 reads the call_id$ synchronization variable in step 1303, which sets its full/empty bit to empty. As indicated by the dashed line, the writing of that synchronization variable in step 1206 then succeeds. The rt_return_vp function then completes the execution of step 1206 and continues to step 1207. In step 1207, the function returns to the location of the user_entry_stub routine immediately after the invocation of the operating system call. The user_entry_stub routine in step 1106 reads the notify done$ synchronization variable. Since the full/empty bit of this synchronization variable is initially empty, this read blocks. The rt_return_thread routine in step 1305 invokes the tera_return_stream operating system call 1400 to return the stream to the operating system. In step 1403, the tera_return_stream operating system writes a value of 0 to the notify_done$ synchronization variable, which sets its full/empty bit to full. This releases the blocked read in step 1106 and the user_entry_stub routine returns to the user code.

Figure 16B:
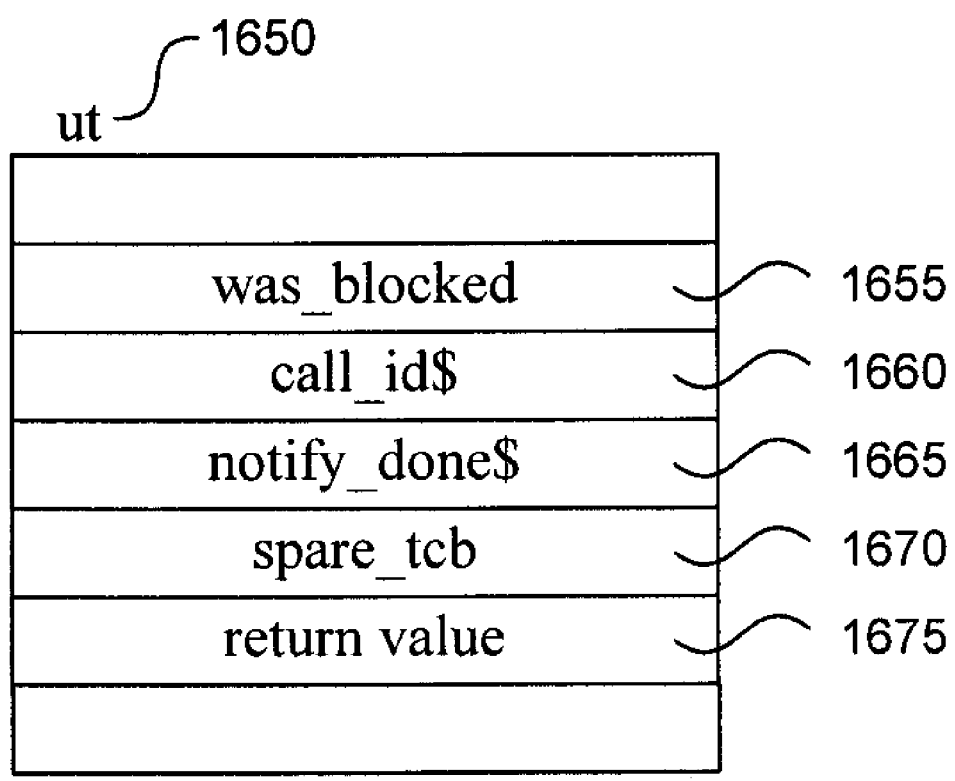
FIG. 16B illustrates the Upcall Transfer (ut) data structure.

FIG. 16B illustrates the Upcall Transfer (Ut) data structure 1650. The ut data structure 1650 is passed to the operating system when a blocking operating system call is invoked. The ut data structure 1650 contains information for synchronizing the return of the stream to the user program. The was_blocked flag 1655 is set to indicate whether the operating system call was blocked so that the user program can wait until the operating system stream is returned to the operating system and so that the function knows when return values need to be retrieved from the ut data structure 1650. The call_id$ synchronization variable 1660 is used to notify the thread that invoked the operating system call and that has locked the thread, that the operating system call is complete. The notify_done$ synchronization variable 1665 is used to notify the thread that the operating system stream has been returned. The spare_tcb pointer 1670 points to the spare thread control block that is used when the operating system notifies the user program that the operating system call is complete. The return_value variable 1675 contains the return value of the operating system call.

Inter-Thread Long Jumps

The Unix operating system supports the concepts of a "long jump." A long jump transfers control from a certain point in a program to an arbitrary return point in the program that was previously identified. A program can identify the return point by invoking a setjmp routine. The setjmp routine sets the return point to the return address of the setjmp routine invocation. When the setjmp routine returns, it returns a certain value to indicate that the setjmp routine has just returned. When a long jump jumps to the return point, the return value has a different value. In this way, the code at the return point can determine whether the setjmp routine has just returned or whether a long jump has just occurred. The setjmp routine also returns information describing the return point. To effect a long jump, a program invokes a longjmp routine passing the information returned by the setjmp routine.

A long jump is useful for immediately jumping to a known location when the user inputs a certain command. For example, if a user has completely traversed a menu hierarchy and is viewing the lowest level menu items, a certain command (e.g., "control-c") can be used to signify that the user wants to immediately return to the highest level menu without having to exit each of the intermediate level menus manually. To effect this immediate return to the highest level menu, the user program can invoke the setjmp routine at the point where the highest level menu is displayed and processed. Whenever the user program receives an indication that the command has been entered by the user (e.g., in an input data routine), the user program can invoke the longjmp routine to effect the immediate jump to the return point of the invocation of the setjmp routine.

The longjmp routine may be invoked by a function that is invoked by other functions to an arbitrary level of nesting. To effect the long jump, the longjmp routine uses well-known techniques to undo the stack frames resulting from the nested invocation and to release any memory that was allocated by the functions whose invocations are represented by the stack frames.

FIGS. 17-22 illustrate the processing of a long jump in a MTA computer. In an MTA computer, one thread of execution may want to effect a long jump to a set jump location (i.e., return point) that was set in another thread of execution (i.e., an inter-thread long jump). To effect such a long jump, in one embodiment of the present invention, the longjmp routine first locates the control block for the set jump thread. The longjmp routine then determines the current state of that set jump thread. Based on the current state, the longjmp routine causes the set jump thread to start executing at the set jump location. If the set jump thread is blocked on an operating system call, then the longjmp routine notifies the operating system to abort that operating system call. The longjmp routine then can set the program counter of the set jump thread to a function that performs a standard (i.e., intra-thread) long jump. When the set jump thread is eventually restarted, it will first invoke the intra-thread long jump to jump to the set jump location.

The longjmp routine may be invoked by a signal handler routine. For example, in a Unix environment, a program is notified of a "control-c" command by a Unix signal. Since, as described above, a new thread is created to handle Unix signals, each long jump in such a signal handler routine is an inter-thread long jump. When a Unix signal is received, the operating system notifies the user program whether any blocked operating system calls will automatically return or automatically be restarted. If the blocked operating system calls are restarted, then the longjmp routine directs the operating system to abort the operating system call on which the thread is blocked, if the thread is blocked on one.

Figure 17:
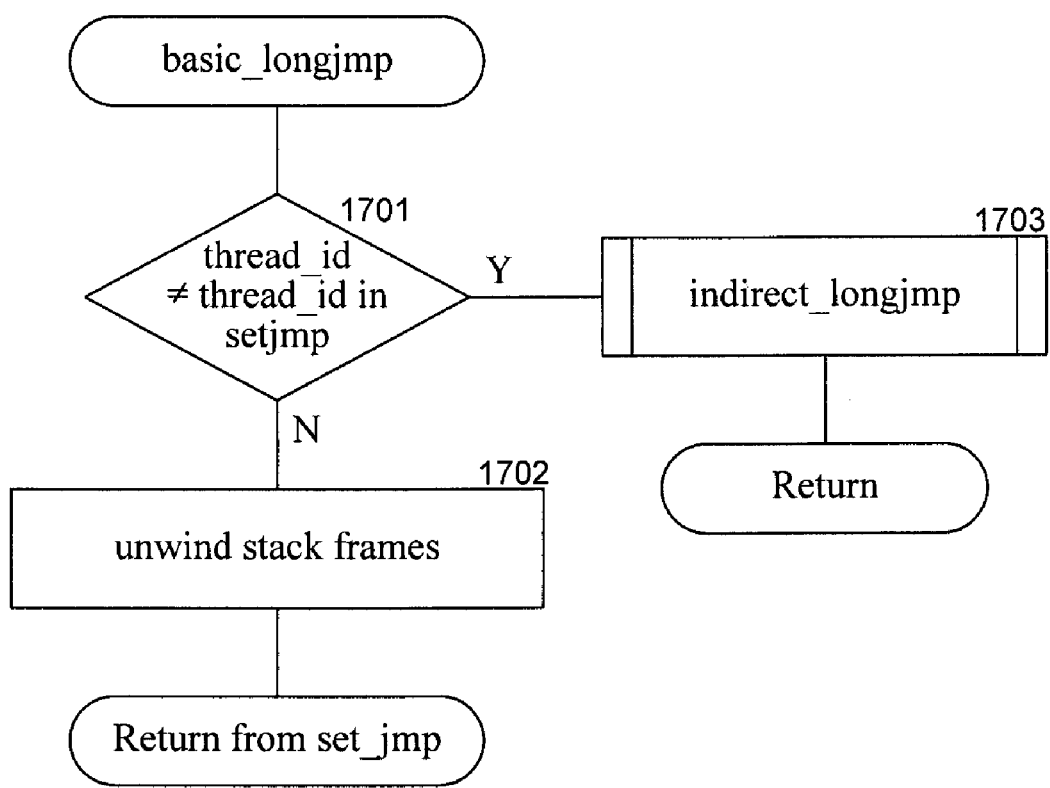
FIG. 17 is a flow diagram of the basic longjmp routine.

FIG. 17 is a flow diagram of the basic longjmp routine. This routine is invoked whenever a long jump is to be performed. This routine determines whether the long jump is inter- or intra-thread and performs the appropriate behavior. This routine is passed a set jump buffer that was generated and returned by the setjmp routine. The set jump buffer contains the thread identifier of the thread that invoked the setjmp routine along with the set jump location information describing the state of the thread when the setjmp routine was invoked. In step 1701, if the currently executing thread is not the thread that invoked the setjmp routine, then the routine continues at step 1703, else the routine continues at step 1702. In step 1702, the routine unwinds at the stack frames, restores the state of the jump buffer and returns to the set jump location. In step 1703, the routine invokes the indirect_longjmp routine to effect an inter-thread long jump. The routine then returns.

Figure 18:
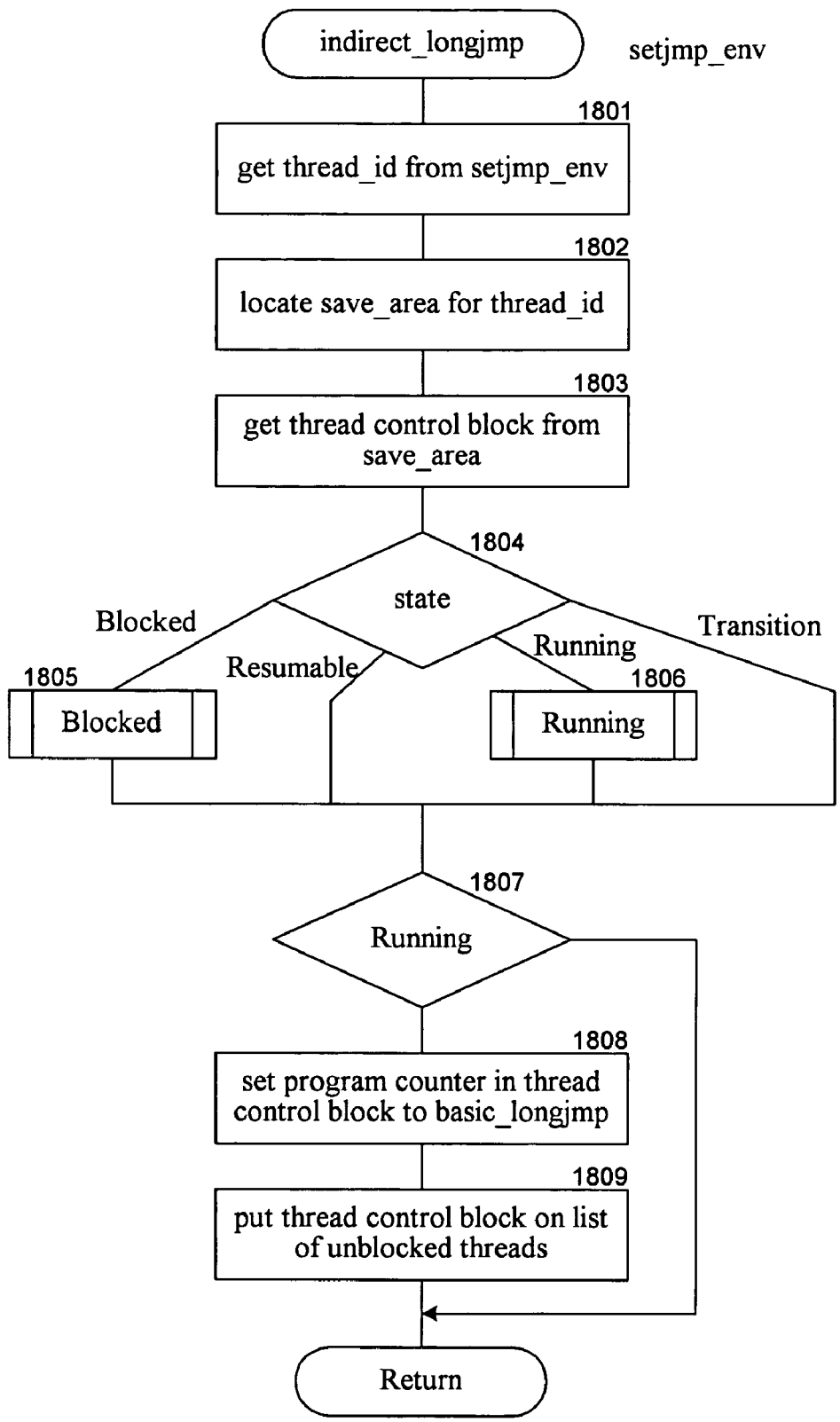
FIG. 18 is a flow diagram of the indirect_longjmp routine.
Figure 19:
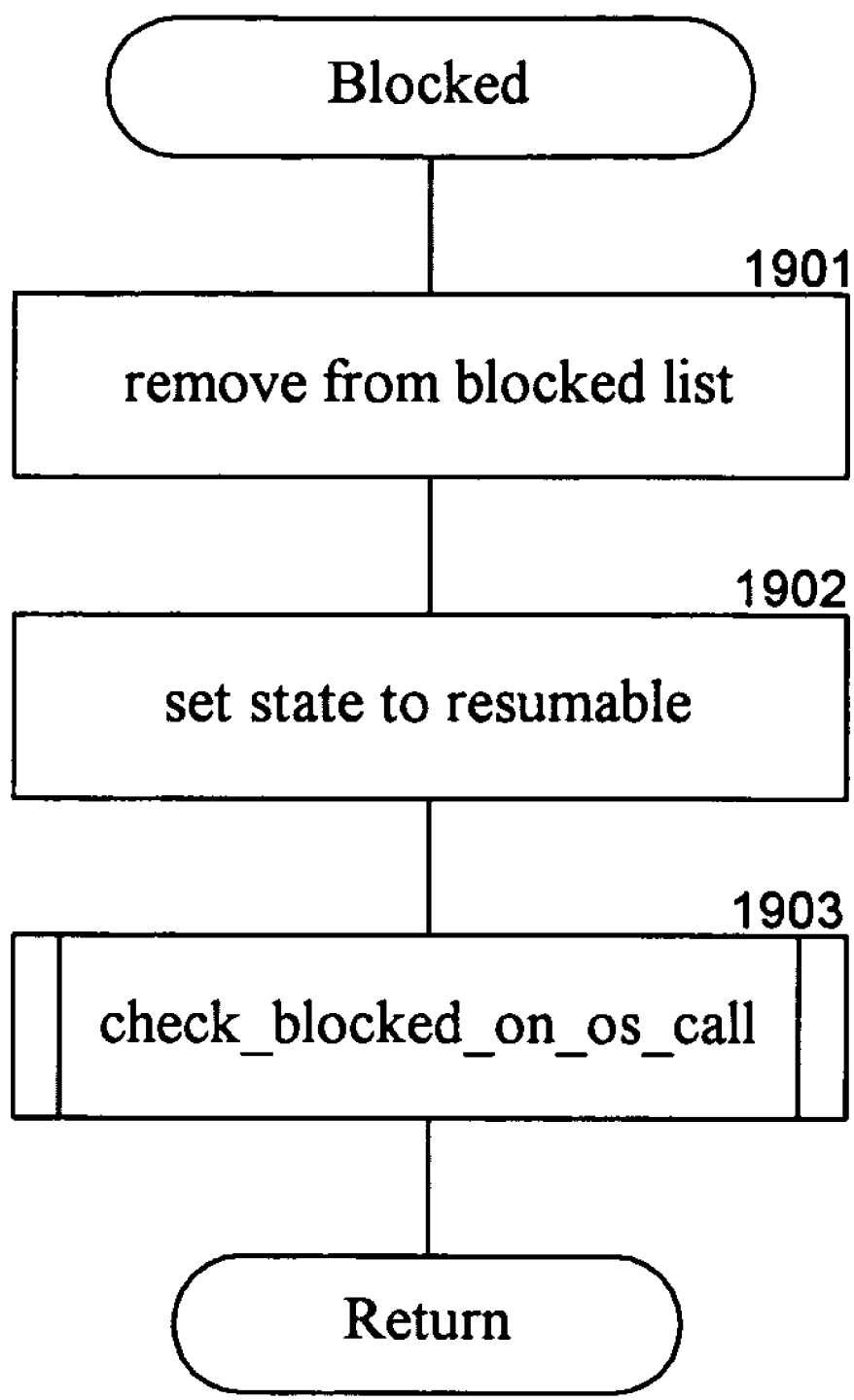
FIG. 19 is a flow diagram of the processing performed when the state of the thread is "blocked."
Figure 20:
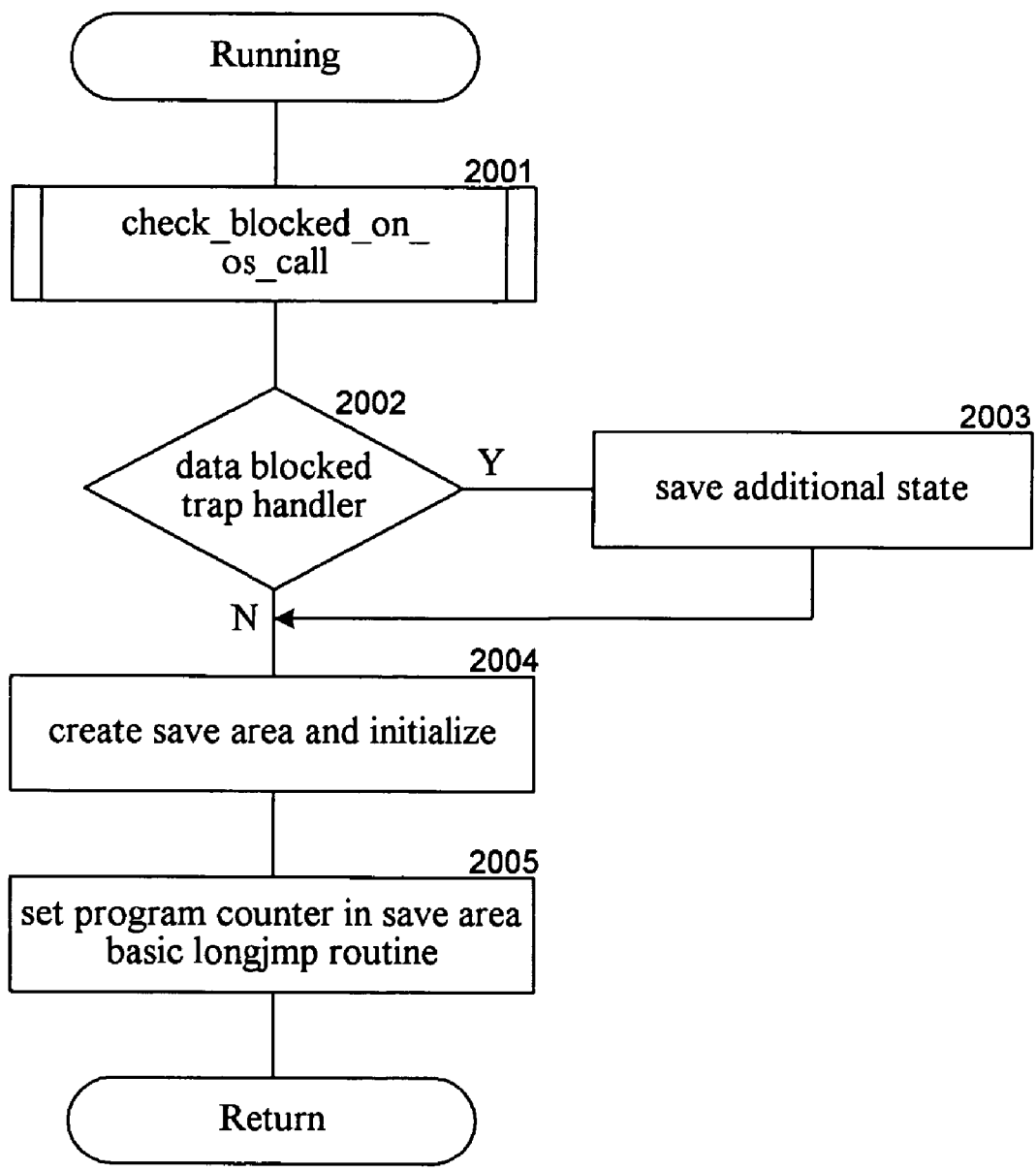
FIG. 20 is a flow diagram of the processing performed when the state of the thread is running.

FIG. 18 is a flow diagram of the indirect_longjmp routine. This routine implements inter-thread long jumps. The routine determines the state of the set jump thread and based on that state, modifies the state information (e.g., program counter) of the set jump thread to effect an inter_thread long jump. In step 1801, the routine retrieves the thread identifier from the set jump buffer. In step 1802, the routine locates the save_area data structure for the set jump thread. In step 1803, the routine retrieves the thread control block from the save_area data structure. In step 1804, the routine jumps to steps 1805, 1807, 1806, or 1807, depending on whether the state of the thread is "blocked," "resumable," "running," or "transition," respectively. A "blocked" thread is one that is blocked on any synchronization timeout. The processing for a blocked thread is shown in FIG. 19. A "running" thread is one that is currently executing on a stream. The processing for a running thread is shown in FIG. 20. A "resumable" thread is one that is ready and waiting to be allocated a stream. No special processing is performed for a resumable thread. A "transition" thread is one that is in the process of being allocated a stream. In step 1807, if the state of the thread is "running," then the routine returns, else the routine continues at step 1808. In step 1808, the routine sets the program counter in the thread control block data structure to the address of the longjmp routine. In step 1809, the routine put the thread control block on a list of unblocked threads. In this way, when the thread starts running, it will invoke the longjmp routine.

FIG. 19 is a flow diagram of the processing performed when the state of the thread is "blocked." In step 1901, the routine removes the thread from the blocked list. In step 1902, the routine sets the state of the thread to "resumable." In step 1903, the routine invokes the check_blocked_on_os_call routine to abort the operating system call if it will be restarted. The routine then returns.

FIG. 20 is a flow diagram of the processing performed when the state of the thread is "running." In step 2001, the routine invokes the check_blocked_on_os_call routine to abort the operating system call if it will be restarted. In step 2002, if the thread is handling a data blocked exception, then the routine continues at step 2003, else the routine continues at step 2004. In step 2003, the routine saves any additional state information that was not saved by the data blocked trap handler. The data block handler saves minimal state information in case the thread decides to immediately redo the operation that caused the exception. In step 2004, the routine creates and initializes a save_area data structure. In step 2005, the routine sets the program counter in the save_area data structure to the address of the longjmp routine and then returns.

Figure 21:
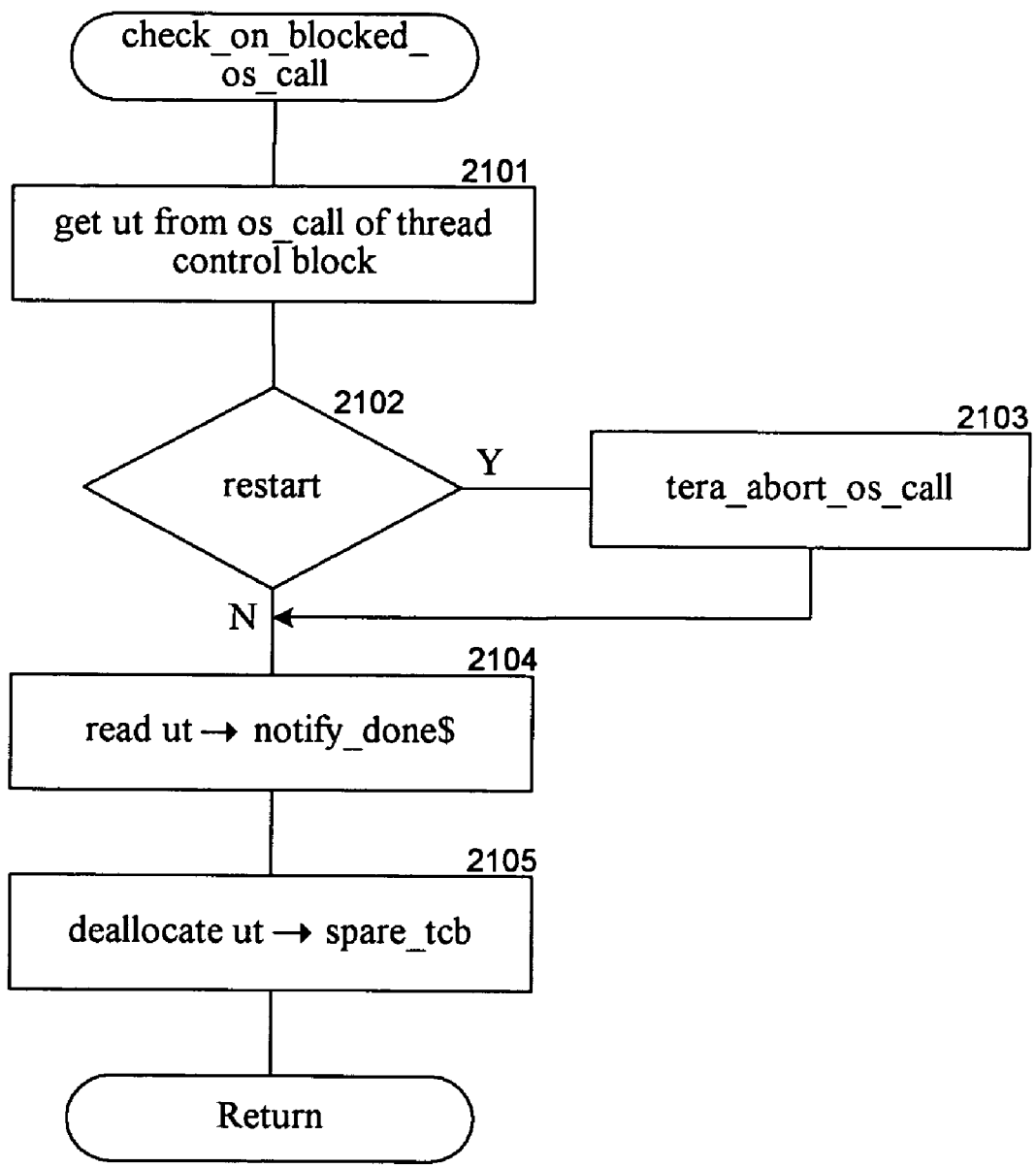
FIG. 21 is a flow diagram of the check_on_blocked_os_call routine.

FIG. 21 is a flow diagram of the check_on_blocked_os_call routine. In step 2101, the routine retrieves the ut data structure from the os_call variable of the thread control block. If the pointer to the ut data structure is null, the routine returns. In step 2102, if the blocked operating system call is being restarted, then routine continues at step 2103, else the routine continues at step 2104. In step 2103, the routine requests the operating system to abort the restarted operating system call. In step 2104, the routine reads the notify_done$ synchronization variable of the ut data structure. This read will cause the longjmp routine to wait until the abort is complete. In step 2105, the routine deallocates the spare thread control block that was used to notify the user program that the operating system call has completed, and returns.

From the foregoing it will be appreciated that, although specific embodiments of the invention have been described herein for purposes of illustration, various modifications may be made without deviating from the spirit and scope of the invention. For example, the principles described herein may be practiced in other computer architectures that support no multiple streams or that support multiple streams either within a single processor or within multiple processors. Accordingly, the invention is not limited except as by the appended claims.

We claim:

1. A method in a computer system for preparing a task to be swapped out from processor utilization, the computer system having multiple processors and an operating system, each processor having multiple streams for simultaneously executing threads of the task, the task having one or more teams of threads, each team representing threads executing on a single processor, the method comprising:
   raising an exception for each stream of each processor currently executing a thread of the task; and
   in response to the raising of the exception, for each stream executing a thread,
      saving a state of the stream;
      determining whether the stream is a team master stream;
      when the stream is not the team master stream, quitting the stream;
      when the stream is the team master stream,
         waiting for all other streams executing threads in the same team to quit;
         determining whether the stream is a task master stream,
         when the stream is not the task master stream, notifying the operating system that the team for this processor is ready to be swapped out;
         when the stream is the task master stream,
            waiting for all other teams to notify the operating system that the team is ready to be swapped out; and
            notifying the operating system that the task is ready to be swapped out.

2. The method of claim 1 wherein the team master stream is a stream that increments a team master variable first.

3. The method of claim 1 wherein the task master stream is a stream that first notifies the operating system that its team is ready to be swapped out.

4. The method of claim 1 wherein the task master stream is a stream that last notifies the operating system that its team is ready to be swapped out.

5. The method of claim 1 wherein the state of the stream is stored in a list of stream states.

6. A system for preparing a task to be swapped out from processor utilization, the system having multiple processors and an operating system, each processor having multiple streams for executing threads of the task, the task having one or more teams of threads, each team representing threads executing on a single processor, each thread having a state, the system comprising:
   a component that raises an exception for each stream of each processor currently executing a thread of the task; and
   an exception handler for each thread that, in response to the raising of an exception for the stream upon which the thread is executing, saves the state of the thread;
determines whether it is a team master stream;
when the stream is not the team master stream, quits;
when the stream is the team master stream,
  waits for all other streams executing threads in the same team to quit;
  determines whether it is a task master stream; and
  when it is not the task master stream, notifies the operating system that the team for this processor is ready to be swapped out; and
when the stream is the task master stream,
  waits for all other teams to notify the operating system that the team is ready to be swapped out; and
  notifies the operating system that the task is ready to be swapped out.

7. The system of claim 6 wherein the team master stream is a stream that increments a team master variable first.

8. The system of claim 6 wherein the task master stream is a stream that first notifies the operating system that its team is ready to be swapped out.

9. The system of claim 6 wherein the task master stream is a stream that last notifies the operating system that its team is ready to be swapped out.

10. The system of claim 6 wherein the state of the stream is stored in a list of stream states.

11. A method in a computer system for preparing a task to be swapped out from processor utilization, the computer system having multiple processors and an operating system, each processor having multiple streams for executing threads of the task, the task having one or more teams of threads, each team representing threads executing on a single processor, the method comprising:
  for each team, designating one stream that is executing a thread as a team master stream;
  designating one stream that is executing a thread as a task master stream for the task;
  for each team master stream, notifying the operating system that the team is ready to be swapped out when each other thread of the team has quit its stream; and
  for the task master stream, notifying the operating system that the task is ready to be swapped when each of the other teams have notified the operating system that that team is ready to be swapped out.

12. The method of claim 11 wherein the operating system swaps out the task upon receiving the notification that the task is ready to be swapped out.

13. The method of claim 11 wherein each stream stores is own state before quitting the stream or notifying the operating system.

14. The method of claim 11 wherein each stream that is not a team master stream quits its stream.

15. The method of claim 11 wherein the notifying of the operating system by the task master stream includes indicating whether the task is blocked so that the operating system can defer swapping in the task until an event occurs to unblock the task.

16. The method of claim 11 wherein each team master stream notifies the operating system of the number of streams that were executing threads so that the operating system can defer swapping in the task until enough streams are available to execute each of the threads that were executing when the task was swapped out.

17. A system for preparing a task to be swapped out from processor utilization, the system having multiple processors and an operating system, each processor having multiple streams for executing threads of the task, the task having one or more teams of threads, each team representing threads executing on a single processor, the system comprising:
  a component that, for each team,
    designates one stream that is executing a thread as a team master stream; and
    designates one stream that is executing a thread as a task master stream for the task;
  a component that, for each team master stream, notifies the operating system that the team is ready to be swapped out when each other thread of the team has quit its stream; and
  a component that, for the task master stream, notifies the operating system that the task is ready to be swapped out when each of the other teams have notified the operating system that that team is ready to be swapped out.

18. The system of claim 17 wherein the operating system swaps out the task upon receiving the notification that the task is ready to be swapped out.

19. The system of claim 17 wherein each stream stores is own state before quitting the stream or notifying the operating system.

20. The system of claim 17 wherein each stream that is not a team master stream quits its stream.

21. The system of claim 17 wherein the component that notifies the operating system that the task is ready to be swapped indicates whether the task is blocked so that the operating system can defer swapping in the task until an event occurs to unblock the task.

22. The system of claim 17 wherein each team master stream notifies the operating system of the number of streams that were executing threads so that the operating system can defer swapping in the task until enough streams are available to execute each of the threads that were executing when the task was swapped out.

23. A method in a computer system for preparing a task to be swapped out from processor utilization, the computer system having a processor and an operating system, the method comprising:
  saving state information of each stream of the processor that is executing a thread;
  under control of each stream that is not a master stream, quitting the stream; and
  under control of the master stream,
    waiting for each stream that is not a master stream to quit; and
    providing a notification that the task is ready to be swapped out.

24. The method of claim 23 wherein the operating system swaps out the task upon receiving the notification that the task is ready to be swapped out.

25. The method of claim 23 wherein each stream saves its own state information.

26. The method of claim 23 including upon being swapped in:
  starting execution of a master stream; and
  under control of the master stream,
    creating a stream corresponding to each stream that quit when the task was swapped out; and
    initializing each created stream based on state information saved before the stream quit.

27. The method of claim 23 wherein the notification includes an indication of whether the task is blocked so that swapping in of the task can be deferred until an event occurs to unblock the task.

28. The method of claim 23 wherein the task notifies the operating system of the number of streams that were executing threads so that swapping in of the task can be deferred until enough streams are available to execute each of the threads that were executing when the task was swapped out.

29. A system for preparing a task in a computer system to be swapped out, the computer system having a processor and an operating system, the processor having streams for executing threads of the task, each stream having a state, the system comprising:
means for saving the state of each stream that is executing a thread;
means for quitting each stream that is not a master stream; and
means for, when the stream is the master stream,
waiting for each stream that is not a master stream to quit; and
notifying the operating system that the task is ready to be swapped out.

30. The system of claim 29 wherein the operating system swaps out the task upon receiving the notification that the task is ready to be swapped out.

31. The system of claim 29 wherein each stream saves its own state.

32. The system of claim 29 including upon being swapped in:
means for starting execution of a master stream; and
means for, when the stream is the master stream,
creating a stream corresponding to each stream that quit when the task was swapped out; and
initializing each created stream based on state information saved before the stream quit.

33. The system of claim 29 wherein the means for notifying the operating system by the master stream includes means for indicating whether the task is blocked so that the operating system can defer swapping in the task until an event occurs to unblock the task.

34. The system of claim 29 including means for notifying the operating system of the number of streams that were executing threads so that the operating system can defer swapping in the task until enough streams are available to execute each of the threads that were executing when the task was swapped out.

35. A method in a computer system for restarting execution of a task that has been swapped out of processor utilization, the method comprising:
starting execution of a master stream; and
under control of the master stream,
creating a stream corresponding to each stream that quit when the task was swapped out; and
initializing each created stream based on state information saved when the stream quit.

36. The method of claim 35 wherein the method is performed by user runtime code.

37. The method of claim 35 wherein the starting is done in response to a signal.

38. The method of claim 37 wherein the signal is generated at the end of a time interval.

39. The method of claim 37 wherein the signal is generated when a routine is invoked.

40. The method of claim 35 wherein the restarting is deferred until a sufficient number of streams is available.

41. A method in a computer system for restarting execution of a task that has been swapped out of processor utilization, the method comprising:
starting execution of a task master stream;
initializing the task master stream based on information saved when the task master stream quit;
under control of the task master stream, starting team master streams; and
under control of each team master stream,
creating a stream corresponding to each stream associated with the master stream that quit when the task was swapped out; and
initializing each created stream based on state information saved when the stream quit.

42. The method of claim 41 wherein the streams associated with a team master stream were executing on the same processor when the streams quit.

43. The method of claim 41 wherein each team master stream executes on a different processor.

44. A method in a computer system for preparing a task to be swapped out from utilization of processors, the method comprising:
saving state information for each stream of the task; and
for each processor,
when no stream of the task executing on the processor is a task master stream,
providing notification that the streams of the processor are ready to be swapped out; and
when a stream of the task executing on the processor is a task master stream,
waiting for a stream of each other processor to provide notification; and
providing notification that the task is ready to be swapped.

45. The method of claim 44 wherein the task master stream is a stream that first notifies the operating system that it is ready to be swapped out.

46. The method of claim 44 wherein the task master stream is a stream that last notifies the operating system that it is ready to be swapped out.

47. The method of claim 44 wherein the state of the stream is stored in a list of stream states.

* * * * *

UNITED STATES PATENT AND TRADEMARK OFFICE
CERTIFICATE OF CORRECTION

PATENT NO. : 7,360,221 B2
APPLICATION NO. : 10/659407
DATED : April 15, 2008
INVENTOR(S) : Alverson et al.

It is certified that error appears in the above-identified patent and that said Letters Patent is hereby corrected as shown below:

On the Title page, in Item (56), under "Other Publications", in column 2, line 1, delete "Efficient" and insert -- Efficiently --, therefor.

On Page 2, in Item (56), under "U.S. Patent Documents", in column 1, line 14, after "Halliwell" insert -- et al. --.

On Page 2, in Item (56), under "U.S. Patent Documents", in column 1, line 15, after "Fitzgerald" insert -- et al. --.

On Page 2, in Item (56), under "U.S. Patent Documents", in column 1, line 19, after "Ault" insert -- et al. --.

On Page 2, in Item (56), under "U.S. Patent Documents", in column 1, line 24, after "Miller" insert -- et al. --.

On Page 2, in Item (56), under "Other Publications", in column 2, line 3, delete "Language" and insert -- Languages --, therefor.

On Page 2, in Item (56), under "Other Publications", in column 2, lines 23-24, delete "Subscription" and insert -- Subscripted --, therefor.

On Page 3, in Item (56), under "Other Publications", in column 1, line 11, delete "Sigmond" and insert -- Sigmod --, therefor.

On Page 3, in Item (56), under "Other Publications", in column 1, line 26, delete "Brigss, Preston," and insert -- Briggs, Preston --, therefor.

On Page 3, in Item (56), under "Other Publications", in column 2, line 23, delete "Contorl" and insert -- Control --, therefor.

In column 10, lines 52-53, delete "post swap" and insert -- post_swap --, therefor.

In column 17, line 23, delete "notify done$" and insert -- notify_done$ --, therefor.

In column 17, line 33, delete "(Ut)" and insert -- (ut) --, therefor.

UNITED STATES PATENT AND TRADEMARK OFFICE
CERTIFICATE OF CORRECTION

PATENT NO.       : 7,360,221 B2
APPLICATION NO.  : 10/659407
DATED            : April 15, 2008
INVENTOR(S)      : Alverson et al.

It is certified that error appears in the above-identified patent and that said Letters Patent is hereby corrected as shown below:

In column 21, line 48, in Claim 13, after "stores" delete "is" and insert -- its --, therefor.

In column 22, line 20, in Claim 19, after "stores" delete "is" and insert -- its --, therefor.

In column 24, line 42, in Claim 44, delete "swapped." and insert -- swapped out --, therefor.

Signed and Sealed this

Ninth Day of September, 2008

JON W. DUDAS
*Director of the United States Patent and Trademark Office*